Patent Number: 5,612,748
Date of Patent: Mar. 18, 1997

United States Patent [19]
Gohshi et al.

[54] SUB-SAMPLE TRANSMISSION SYSTEM FOR IMPROVING PICTURE QUALITY IN MOTIONAL PICTURE REGION OF WIDE-BAND COLOR PICTURE SIGNAL

[75] Inventors: Seiichi Gohshi; Yoshinori Izumi; Masahide Naemura; Kouichi Yamaguchi, all of Tokyo, Japan

[73] Assignee: Nippon Hoso Kyokai, Tokyo, Japan

[21] Appl. No.: 469,425

[22] Filed: Jun. 6, 1995

Related U.S. Application Data

[63] Continuation of Ser. No. 974,573, filed as PCT/JP92/00705 May 29, 1992 published as WO93/00771 Jul. 1, 1993, abandoned.

[30] Foreign Application Priority Data

Jun. 27, 1991 [JP] Japan .................................. 3-181555
Dec. 18, 1991 [JP] Japan .................................. 3-334942
Jan. 24, 1992 [JP] Japan .................................. 4-011155

[51] Int. Cl.$^6$ .................................................. H04N 7/24
[52] U.S. Cl. ............................................ 348/424; 348/392
[58] Field of Search ..................................... 358/133, 136, 358/98; 348/424, 392, 394, 416, 425, 391, 390, 384, 399

[56] References Cited

U.S. PATENT DOCUMENTS

| | | | |
|---|---|---|---|
| 4,692,801 | 9/1987 | Ninomiya et al. | 358/133 |
| 4,745,459 | 5/1988 | Ninomiya et al. | |
| 5,136,379 | 8/1992 | Ishii | 358/133 |
| 5,150,207 | 9/1992 | Someya | 358/133 |
| 5,327,241 | 7/1994 | Ishizu et al. | 348/606 |

FOREIGN PATENT DOCUMENTS

| | | |
|---|---|---|
| 0311191A1 | 4/1989 | European Pat. Off. |
| 643432 | 1/1989 | Japan |

OTHER PUBLICATIONS

Yuichi Ninomiya, et al, "High-vision Satellite Transmission System-MUSE-", The Journal of the Television Society, vol. 42, No. 5, May 1988, pp. 468-477.

Seiichi Gohshi, et al, "A New Signal Processing Method for the MUSE System", NHK Science and Technical Research Laboratories (month and year not available).

Yuichi Ninomiya, et al, "Concept of the MUSE System and its Protocol", NHK Laboratories Note, Jul. 1987.

*Primary Examiner*—Thai Q. Tran
*Assistant Examiner*—Bryan S. Tung
*Attorney, Agent, or Firm*—Watson Cole Stevens Davis, P.L.L.C.

[57] ABSTRACT

In the case where a wide-band color picture signal provided for a high-definition television broadcasting is sub-sampled for narrow-band transmission, in comparison with a stationary picture signal which is applied with sub-sampling according to a sampling pattern circulated at every two frames, the color picture signal in motional picture regions, which is conventionally applied with line-offset sub-sampling at every field, has a lowered resolution. To improve the resolution concerned, color difference signals in motional picture regions are applied with inter-field offset sub-sampling together with band-limitation for preventing aliasing distortion accompanied with subsampling and signal processing including interpolation for reproduction, which are effected in a form completed at every frame. As for motional picture regions having small motion, a luminance signal is applied also with similar sub-sampling and similar signal processing. As a result, the overall picture quality of the reproduced motional color picture is improve by signal processing thus adapted for color pictures in motional picture regions.

5 Claims, 20 Drawing Sheets

PRIOR ART

FIG_3

FIG_7

PRIOR ART  FIG. 8

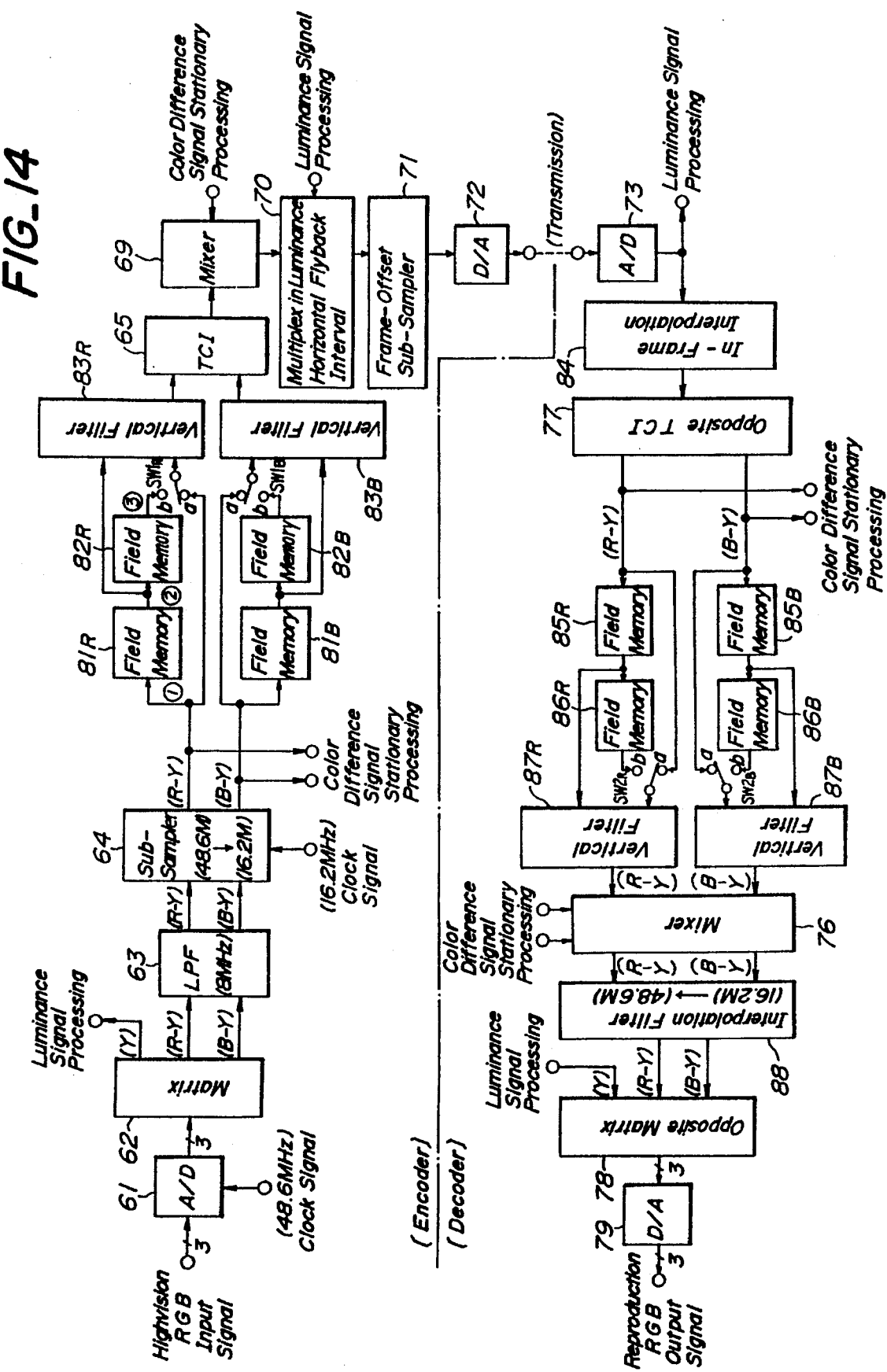
FIG_14

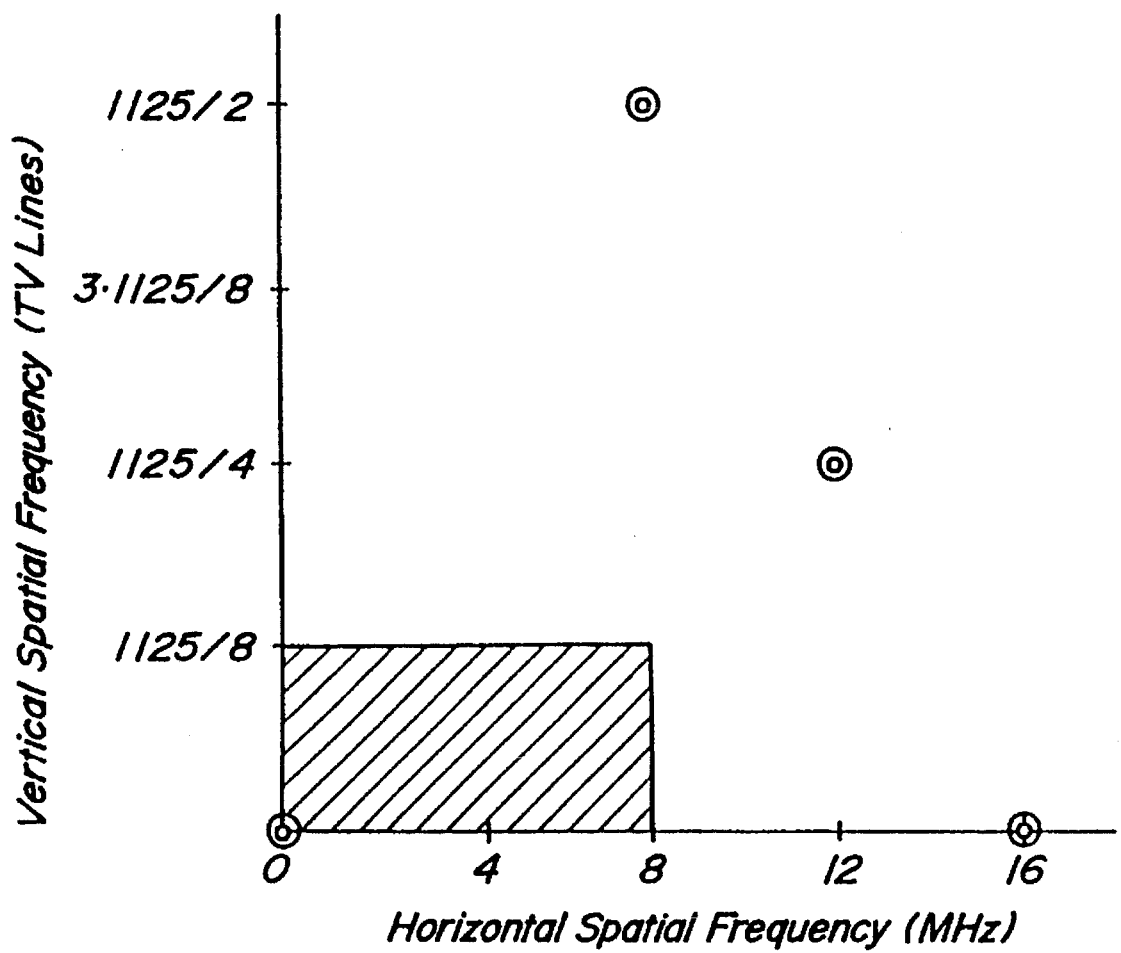
FIG_15

FIG_18

48.6MHz 32.4MHz 32.4MHz 16.2MHz (Frame Turnover)

16.2MHz

SUB-SAMPLE TRANSMISSION SYSTEM FOR IMPROVING PICTURE QUALITY IN MOTIONAL PICTURE REGION OF WIDE-BAND COLOR PICTURE SIGNAL

This application is a continuation of application Ser. No. 07/974,573, filed as PCT/JP92/00705 May 29, 1992 published as WO93/00771 Jul. 1, 1993 (now abandoned).

TECHNICAL FIELD

The present invention relates to a sub-sample transmission system for a wide-band color picture signal a bandwidth of which is compressed by multiple offset inter-field and inter-frame sampling of the same. More particularly, the present invention relates to a system for improving picture quality in a motional picture region of a wide-band color picture signal on the basis of information relating to physical and visual properties of motional pictures.

BACKGROUND ART

One transmission systems for the wide-band color picture signals the bandwidth of which is compressed by the multiple sub-sampling, is called the MUSE (Multiple Sub-Nyquist Sample Encoding) system, which is submitted to experimental broad-casting in Japan and is a superior narrow-band transmission system for band-compressed wide-band color picture signals.

The principle of band-compressed narrow-band transmission of this MUSE system consists in that the sub-sampling is effected at sampling points, positions of which are different between mutually adjacent lines, fields or frames, so as to transmit as much picture information as possible by employing as few sample values as possible and further so as to previously remove aliasing distortions caused in a reproduced picture by the sub-sampling efficiently through a prefilter provided in an encoder, which suitably restricts the bandwidth of the picture signal.

In the sub-sampling of the MUSE system, any of inter-line, inter-field and inter-frame sub-sampling are effected for both motional and stationary picture signals according to the principle of employment of fixed density sampling system at a predetermined sampling rate. However, in practice, a somewhat complicated sampling system is carried out according to the combination of several different sampling rates.

As a result, a sampling pattern of the transmission signal from the encoder is a quincuncial sampling pattern in which the arrangement of sampling points in each field is circulated at every four fields so as to reduce the number of samples in each field to be as small as possible. On the other hand, in the decoder receiving the transmitted sample values of quincuncial pattern, with regard to the stationary picture region, the inter-field and the inter-frame inter-polations are effected by utilizing all of the sample values of every four fields in which the sampling pattern is completed, so as to reproduce a substantially completed original picture, while, with regard to the motional picture region, the inter-field interpolation cannot be effected because of the inter-field time difference of ⅙₀ second which is caused in the picture contents in response to the picture motion, so that the in-field, namely inter-line, interpolation is effected only on the sample values in every one field. The detail of this MUSE system is described in the specifications of Japanese Patent Application No. 58-194,115 (corresponding to U.S. Pat. No. 4,745,459) and Japanese Patent Application No. 60-106,132 (corresponding to U.S. Pat. No. 4,692,801, which are assigned to the present assignee, and the document of NHK Laboratory Note No. 348"Concept of the MUSE System and its Protocol", which is published by the present assignee. In this connection, the outline of the encoder of the MUSE system, which relates to the subject of the present invention, will be described by referring to FIG. 1 hereinafter.

In the encoder of the MUSE system which is outlined in FIG. 1, each primary color picture signals R, G, B of a high definition color television signal, namely, a so-called highvision, are supplied, through low-pass filters (LPF) $1_R$, $1_G$, $1_B$ (each having its pass-band limited below 21 MHz or 22 MHz) to analog-to-digital converters (A/D) $2_R$, $2_G$, $2_B$ so as to be digitized at clock rate 48.6 MHz. The outputs from the A/D converters are supplied through a gamma-correction circuit 3 in common to a matrix circuit 4 so as to convert the primary color picture signals R, G, B by matrixing into a luminance signal Y and two kinds of color difference signals $C_1$ $C_2$, the former Y being directly supplied to a TCI encoder 6, and the latters $C_1$, $C_2$ being supplied to the same encoder 6 respectively through low-pass filters (LPF) $5_{c1}$, $5_{c2}$, passbands of which are commonly limited below 8.1 MHz.

TCI encoder 6 is provided for converting the luminance signal Y and the color difference signals $C_1$, $C_2$ to a single time-sequencial signal through time-axis compression and time-divisional multiplication, so as to apply time-divisional multiplication upon these three signals by inserting the color difference signals $C_1$, $C_2$, which are applied with time-axis compression and then combined alternately in line-sequence, into line fly-back intervals of the luminance signal Y.

The time-sequential picture signal derived from the TCI encoder 6 is separated into a stationary picture sequence Ⓢ and a motional picture sequence Ⓜ. The time-sequential picture signal of the stationary picture sequence Ⓢ is supplied to an inter-field prefilter 7 so as to previously remove signal components in a frequency range in which aliasing distortion is caused by the subsequent sub-sampling and thereafter is supplied to an inter-field offset subsampler 8 so as to apply the inter-field offset subsampling thereon at the sample rate 24.3 MHz, an output sub-sample series picture signal being supplied to a sample rate converter 10 through a low-pass filter (LPF) 9, a pass band of which is limited below 12 MHz, so as to convert the sample rate from 48.6 MHz to 32.4 MHz and thereafter being supplied to a mixer 13. On the other hand, the time-sequential picture signal of the motional picture sequence Ⓜ is supplied to an in-field pre-filter 11 so as to previously remove signal components in a frequency range in which the aliasing distortion is caused by the subsequent sub-sampling and thereafter is supplied to a sample rate converter 12 so as to convert the sample rate from 48.6 MHz to 32.4 MHz and then is supplied to the same mixer 13.

In the mixer 13, the time-sequential picture signals of the stationary and the motional picture sequences Ⓢ and Ⓜ care appropriately mixed in response to the result of motion detection in a motion detector 14 specially provided in the encoder, the mixed output time-sequential picture signal being supplied to an inter-line and inter-frame offset sub-sampler 15, so as to form a sample series picture transmission signal of the MUSE system by applying the inter-frame and interline offset sampling in response to the quincuncial pattern at the sample rate 16.2 MHz.

The encoder of the MUSE system which is recognized as a preferred example of the sub-sample transmission system for the wide-band color picture signal is basically arranged as described above by referring to FIG. 1 and the feature of this arrangement exists in the respect that the sub-sample transmission mode of the picture signal is separated into a stationary picture transmission mode and a motional picture transmission mode in response to the existence of picture motion and the amount thereof, which modes are mixed with each other at an appropriate ratio or are appropriately changed to each other in response to the result of picture motion detection, so as to substantially faithfully reproduce the original picture with the most suitable picture quality.

In the stationary picture transmission mode, the original picture is substantially perfectly reproduced by applying the inter-field and inter-frame interpolation on sampling pattern which is circulated at every four fields, while, in the motional picture transmission mode, the original picture is reproduced with the original picture quality substantially maintained by the in-field interpolation to avoid inter-field time difference of picture contents.

Accordingly, in the encoder having the outlined arrangement as shown in FIG. 1, the pass-band characteristics of the pre-filters 7 and 11, for limiting the transmission bands of the stationary picture signal and the motional picture signal respectively, is set up in conformity with the respective transmission mode. Particularly, with regard to the motional picture transmission mode, the pass-band limitation basically assuming the simple in-field signal processing applied only on picture sample values at every field is effected, so that the picture reproduced by the in-field interpolation corresponding thereto has a difficult problem of picture quality deterioration to be improved, including dimness resulting from the insufficient amount of picture information, even though the required definition is visually mitigated by the picture motion.

An object of the present invention is to solve the above difficult problem and to provide a sub-sample transmission system for a broad band color picture signal in which the transmitted picture quality deterioration caused in the sub-sample transmission system according to the conventional basic arrangement, particularly, that which is caused in the motional picture region mainly assuming the in-field signal processing can be remarkably improved by the broad investigation with regard to various respects.

DISCLOSURE OF INVENTION

The present inventors investigated, by referring to various information obtained from the development of the aforesaid MUSE transmission system and the subsequent experimental broadcasting, room left for improving the picture quality transmitted in the sub-sample narrow band transmission of the broad band color picture signal from various viewpoints, particularly from the viewpoint of the picture quality improvement in the motional picture region, so as to study physical factors and visual factors of the picture quality deterioration. As a result, the present inventors conceived, on the basis of novel information such that each of the above-factors are mainly caused by the infield signal processing conventionally applied on the picture signal in the motional picture region, a sub-sample transmission system for wide-band color picture signals arranged by principally introducing inter-field processing, particularly, that which is completed in every frame and by applying improvements respectively adapted to various factors of the picture quality deterioration.

Further, a first factor of picture quality deterioration is flicker having a frequency 15 Hz, that is, one half of frame frequency.

A special spectrum distribution in the horizontal and vertical spatial frequency region, which is generated in the sampling process and does not contribute to the motional picture reproduction but cannot be dealt with by the simple in-field filtering conventionally applied on the picture signal in the motional picture region, cannot be completely removed by the hardware conventionally used for the practical signal processing because of unlimited expansion in the vertical frequency axis direction in the vertical frequency region and hence causes the aliasing distortion in the reproduced motional picture, so that this special spectrum distribution causes a remarkable deterioration of the picture quality by the above flicker. However, this troublesome special spectrum distribution can be precisely removed by inter-field signal processing, which can attain the improved definition of the reproduced motional picture.

In the next place, a difficult problem common to the second and subsequent factors of the picture quality deterioration is an insufficient amount of reproduced motional picture information, which is caused by assuming the in-field signal processing conventionally applied on the picture signal in the motional picture region. The present inventors found the fact that, under the condition suitable for these factors, the picture quality deteriorations respectively caused by these factors can be appropriately improved by inter-field processing introduced into the signal processing in the motional picture region.

The second factor of the picture quality deterioration is the essentially lowered definition of the reproduced color picture in the motional picture region which is caused by the insufficient amount of picture information interpolated in the motional picture region applied with inter-field signal processing. However, improved picture quality of the reproduced motional color picture signal can be attained through the expansion of frequency range of the color difference signal, which is realized by completing an inter-field offset sub-sampling, a frequency band limitation for preventing aliasing distortion and an interpolation effected in picture reproduction at every frame with regard to the color difference signal, the base band width of which is conventionally halved in the motional picture region in comparison with that in the stationary picture region.

The third factor of the picture quality deterioration is the insufficiency of visual definition of the luminance signal in addition to that of the color difference signal, the base band width of which is halved in the transmission thereof, with regard to the color picture signal in the motional picture region applied with the in-field signal processing. However, in a range in which the picture motion in the vertical direction is not large, the overall picture quality can be further improved by applying signal processing completed in every frame consisting of odd and even fields on the luminance signal also, so as to obtain a reproduced motional picture having an intermediate definition between the stationary picture and the motional picture having a large motion in the vertical direction.

In short, the sub-sample transmission system for wide-band color picture signals according to the present invention is featured in that, at the time when a sub-sample transmission for a wide-band color picture signal is effected by an offset sub-sample transmission arranged in response to a sampling pattern circulated at every two frames, inter-field offset sub-sampling is applied on a picture signal in a motional picture region together with an inter-field signal processing adapted for a characteristic of the motional picture in said region.

The sub-sample transmission system for wide-band color picture signals according to the present invention is further featured in that, at the time when a motional picture signal is transmitted by sampling thereof, the motional picture signal in a vertical frequency band, having a band-width which is substantially one to three times a Nyquist band corresponding to the sampling frequency in a vertical frequency region, is transmitted with a limited horizontal frequency band, so as to reduce an aliasing distortion caused in a reproduced picture by the sub-sampling.

The sub-sample transmission system for wide-band color picture signals according to the present invention is still further featured in that, at the time when a motional picture signal is transmitted by sampling thereof, the picture signal is sampled by a field-offset sub-sampling in which positions of sample points are alternately shifted between adjacent fields, while signal processing, including at least band-limitation of a luminance signal and interpolation of sample values, is completed at every frame.

The sub-sample transmission system for wide-band color picture signals according to the present invention is still further featured in that, in the motional picture region, as for a color difference signal, which is transmitted with a horizontal spatial frequency band, which is halved in comparison with that of a luminance signal, an inter-field offset sub-sampling, a frequency band limitation for preventing an aliasing distortion caused by said sub-sampling and an interpolation in reproduction are completed at every frame consisting of odd and even fields.

The sub-sample transmission system for wide-band color picture signals according to the present invention is still further featured in that, in the motional picture region in which a motion in the vertical direction is small, as for a luminance signal, an inter-field offset sub-sampling, a frequency band limitation for preventing an aliasing distortion caused by said sub-sampling and an interpolation in reproduction are effected by an inter-field processing.

In this connection, the signal processing at every frame in the sub-sample transmission system according to the present invention facilitates not only reproduction of the motional color picture having a preferable resolution by applying the above signal processing on the motional picture, but also the attainment of a preferable picture quality which exceeds a certain level by applying the above signal processing on a stationary picture sequence, so that, even if the system is arranged on a small scale by employing only one signal processing system in common, a preferable reproduced color picture quality, which exceeds the certain level, can be obtained in the wide-band color picture signal transmission.

BRIEF DISCLOSURE OF DRAWINGS

FIG. 14 is a block diagram showing an exemplified arrangement of a sub-sample transmission system for a color picture signal according to the present invention;

FIG. 15 is a characteristic curve showing an example of a transmissible spatial frequency band of a color difference signal in a motional picture region in the same sub-sample transmission system;

Figures 16A, 16B:
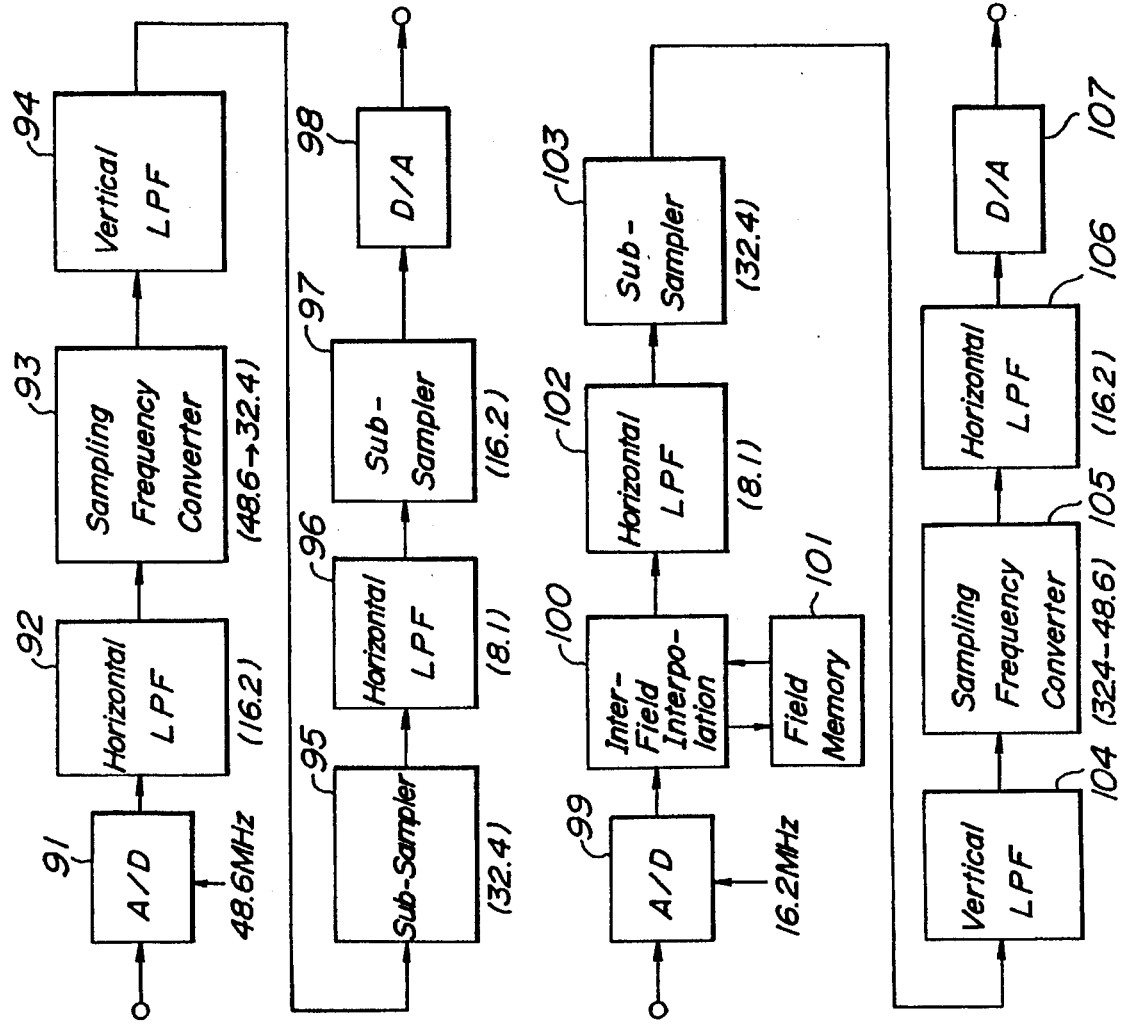
Figure 17:
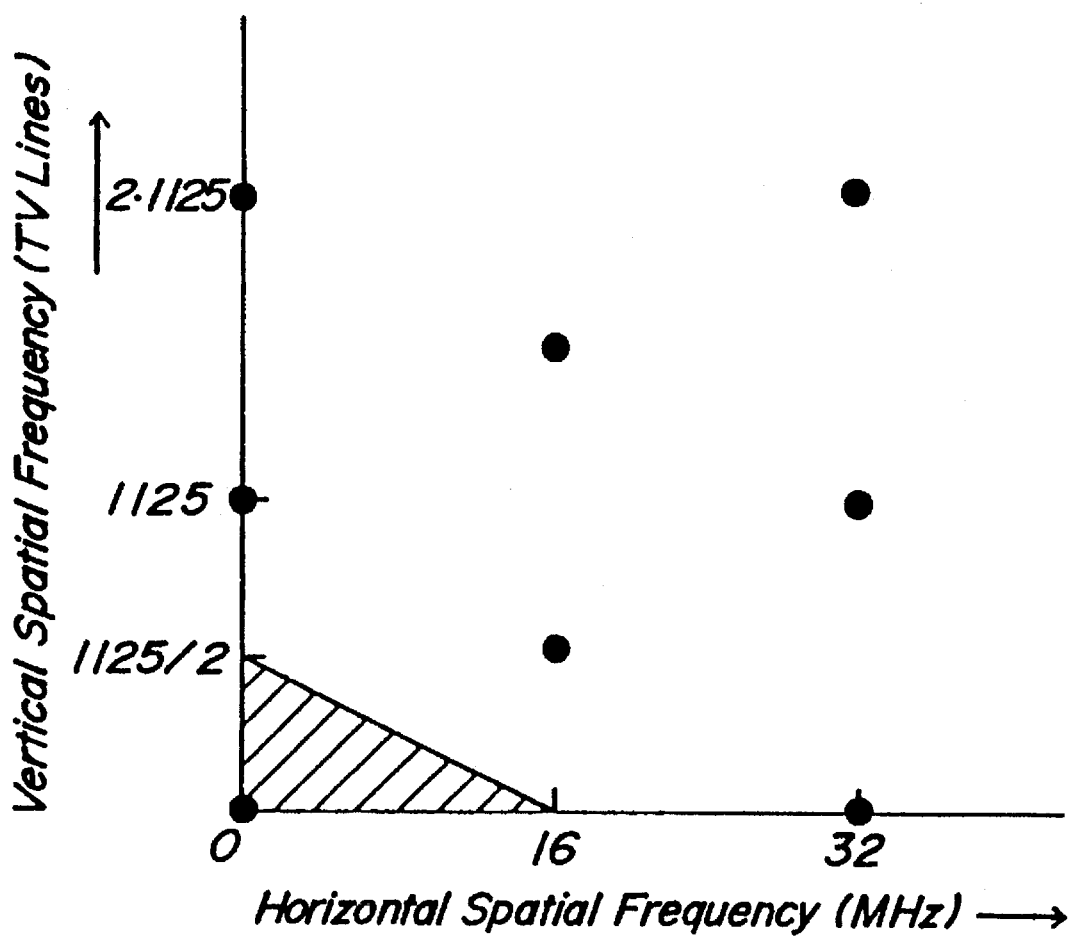
Figure 18:
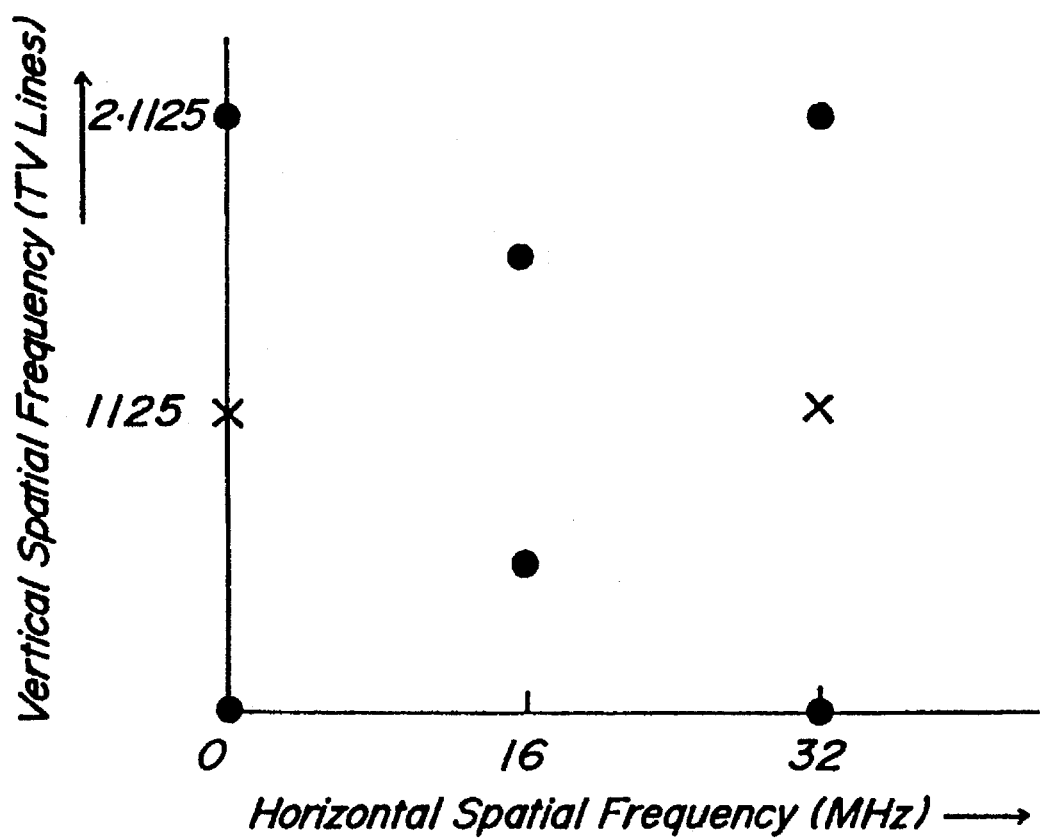
Figure 19:
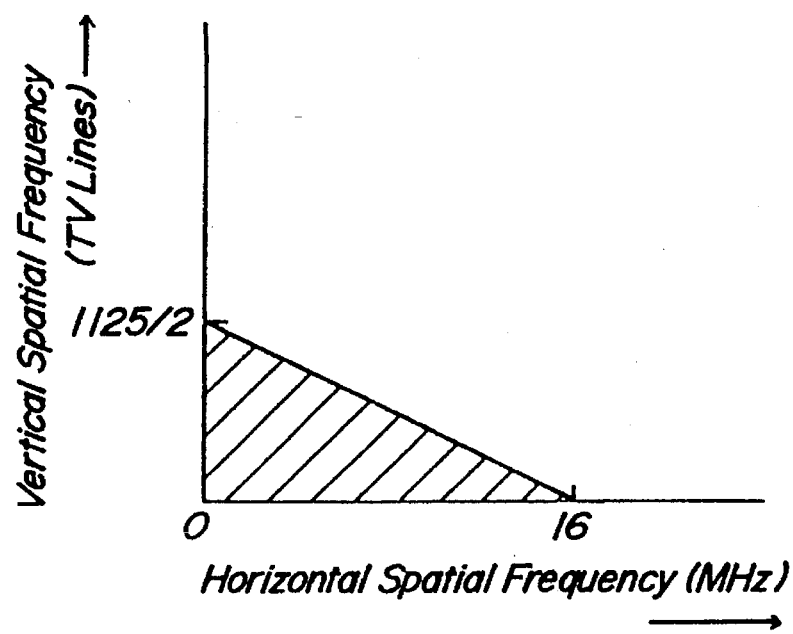
Figure 20:
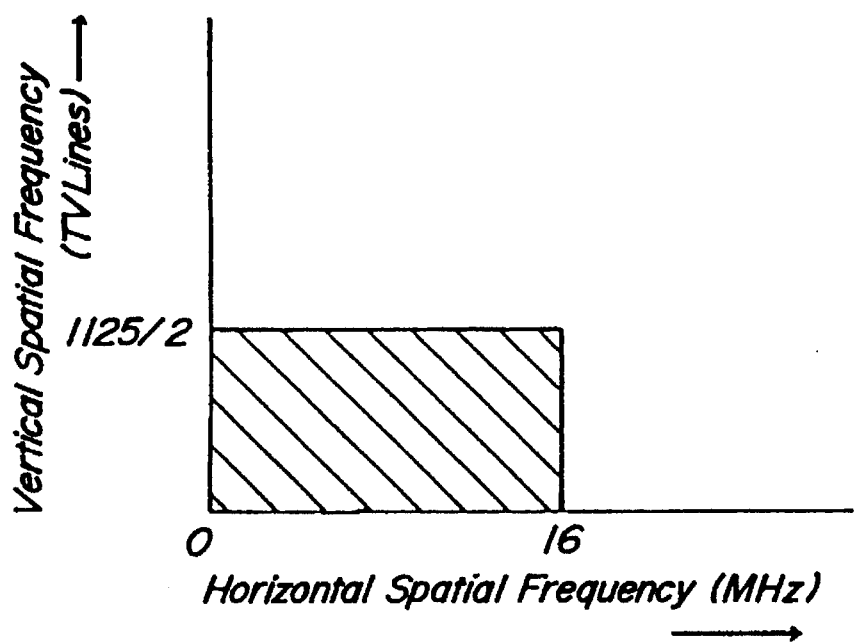

FIG. 16(a) and FIG. 16(b) are block diagrams showing outlined arrangements of an encoder and a decoder in a picture signal sub-sample transmission system according to the present invention, respectively;

FIG. 17 is a diagram showing positions of sample carriers in a spatial frequency region of an in-field line-offset sub-sample transmission picture signal;

FIG. 18 is a diagram showing positions of sample carriers in a spatial frequency region of an inter-field offset sub-sample transmission picture signal;

FIG. 19 is a diagram showing a transmissible frequency band in a spatial frequency region of an in-field line-offset sub-sample transmission picture signal;

FIG. 20 is a diagram showing a transmissible frequency band in a spatial frequency region of an inter-field offset sub-sample transmission picture signal; and FIG. 21(a) to FIG. 21(e) are diagrams successively showing sampling patterns in respective portions of the encoder and the decoder as shown in FIGS. 16(a) and 16(b), respectively.

BEST MODE FOR CARRYING OUT THE INVENTION

Preferred embodiments of the present invention will be described in detail by referring to accompanying drawings hereinafter.

Figure 1:
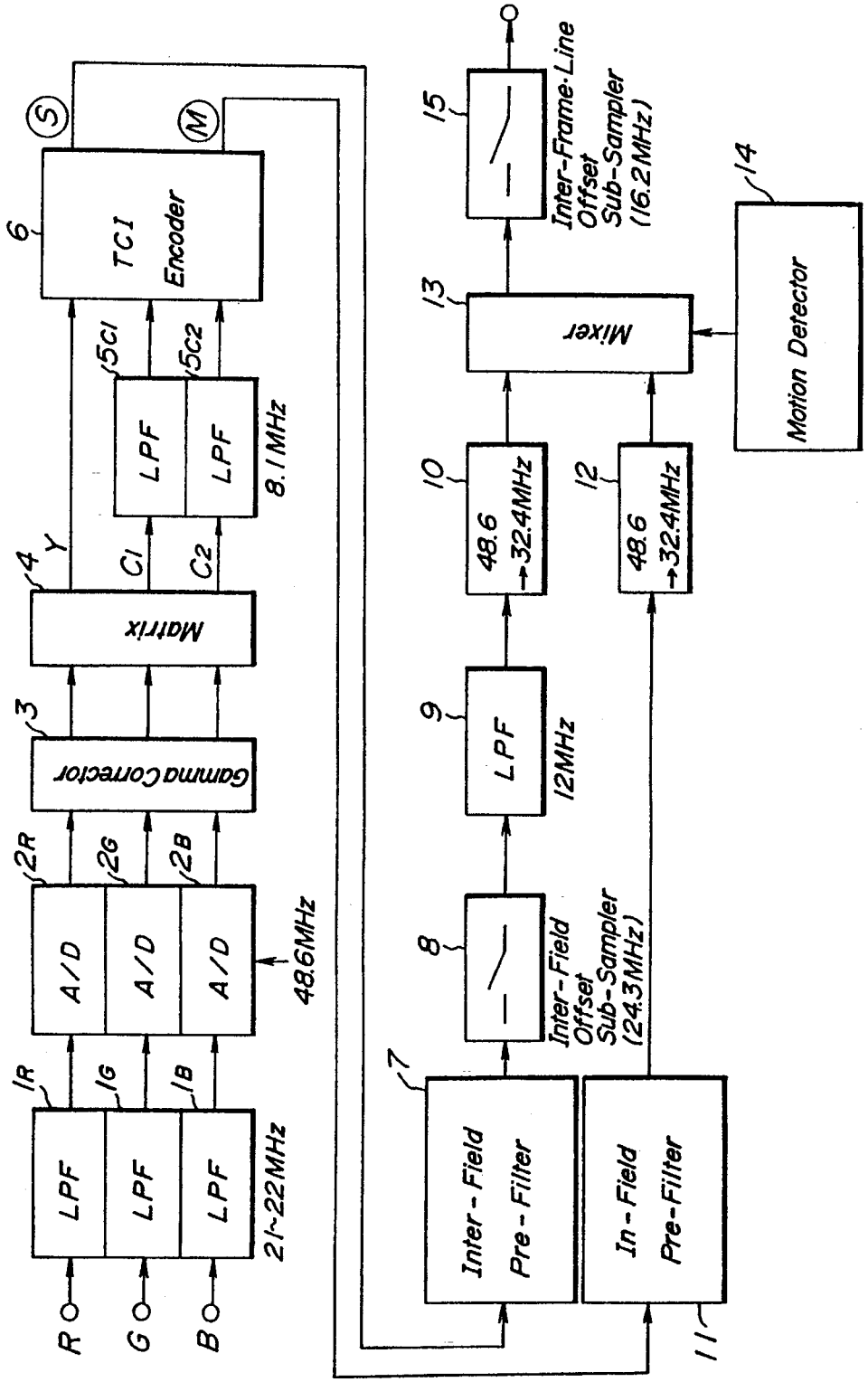
FIG. 1 is a block diagram showing an outlined arrangement of an encoder according to a conventional sub-sample transmission system for a color picture signal.
Figure 2:
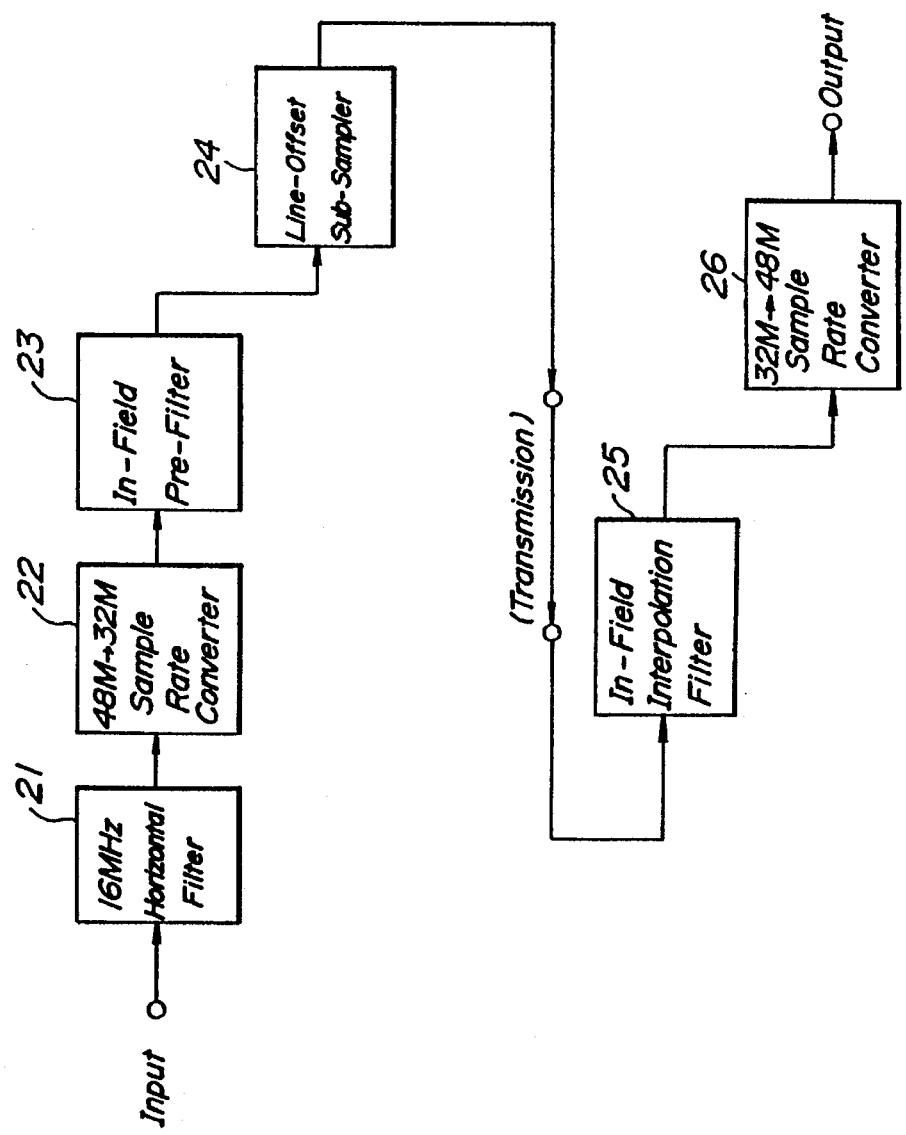
FIG. 2 is a block diagram showing an outlined arrangement of a conventional picture signal sub-sample transmission system.

A signal processing system for a motional picture signal in a high-vision broadcasting system, for instance, a MUSE system is conventionally arranged as shown in FIG. 2 in general. That is, for instance, in an encoder on a transmitting end of the MUSE system, an input picture signal having an original sample frequency 48.6 MHz is supplied to a sample rate converter 22 through a low-pass filter, an upper limit of the pass band of which is equal to a sample frequency 16.2 MHz during the transmission thereof, so as to convert the original sample frequency 48.6 MHz provided for high definition transmission into another sample frequency 32.4 MHz provided for an inter-frame offset sampling which is adapted to the transmission of the motional picture having contents varied between adjacent frames by lowering the original sample frequency to ⅔ thereof. A resultant sampled motional picture signal is supplied to an in-field pre-filter 23, so as to effect the band-limitation for previously removing higher range components in the vicinity of the sample point which cause the aliasing distortion accompanied by the sampling within every field under consideration of the picture motion. A resultant band-limited and sampled motional picture signal is supplied to a line-offset sub-sampler 24, so as to derive a motional picture signal for the sub-sample transmission having a sample frequency 16.2 MHz further through an inter-line offset sub-sampling.

On the other hand, in a decoder on a receiving and reproducing slide of the MUSE system, the above motional picture signal for the sub-sample transmission is supplied to an in-field interpolation filter 25, so as to reproduce the sampled motional picture signal having the sample frequency 32.4 MHz by applying interpolation within every field on the sample values of the transmission motional picture signal. A resultant sampled motional picture signal is supplied to a sample rate converter 26, so as to restore the input picture signal on the transmitting end by reconverting the sample frequency 32.4 MHz to the original sample frequency 48.6 MHz.

The spectrum in the horizontal and vertical spatial frequency region of the band-limited and sampled motional picture signal, which is supplied from the in-field pre-filter 23 to the line-offset sub-sampler 24 on the transmitting end of the signal processing system arranged as mentioned above, is distributed as shown in FIG. 3. That is, the horizontal frequency range of the sampled motional picture signal is restricted below the sample frequency 16.2 MHz for the transmission through the horizontal low-pass filter 21, while, as for the vertical frequency range, a rectangular-triangle-shaped spatial frequency region, a top of which is disposed at the coordinate origin and a base of which is stretched between a sample point 16.2 MHz on the horizontal frequency axis and a sample point 1125/2 TV lines corresponding thereto on the vertical frequency axis, is extended in the direction of the vertical frequency axis without any restriction through alternate turns-over.

Figure 4:
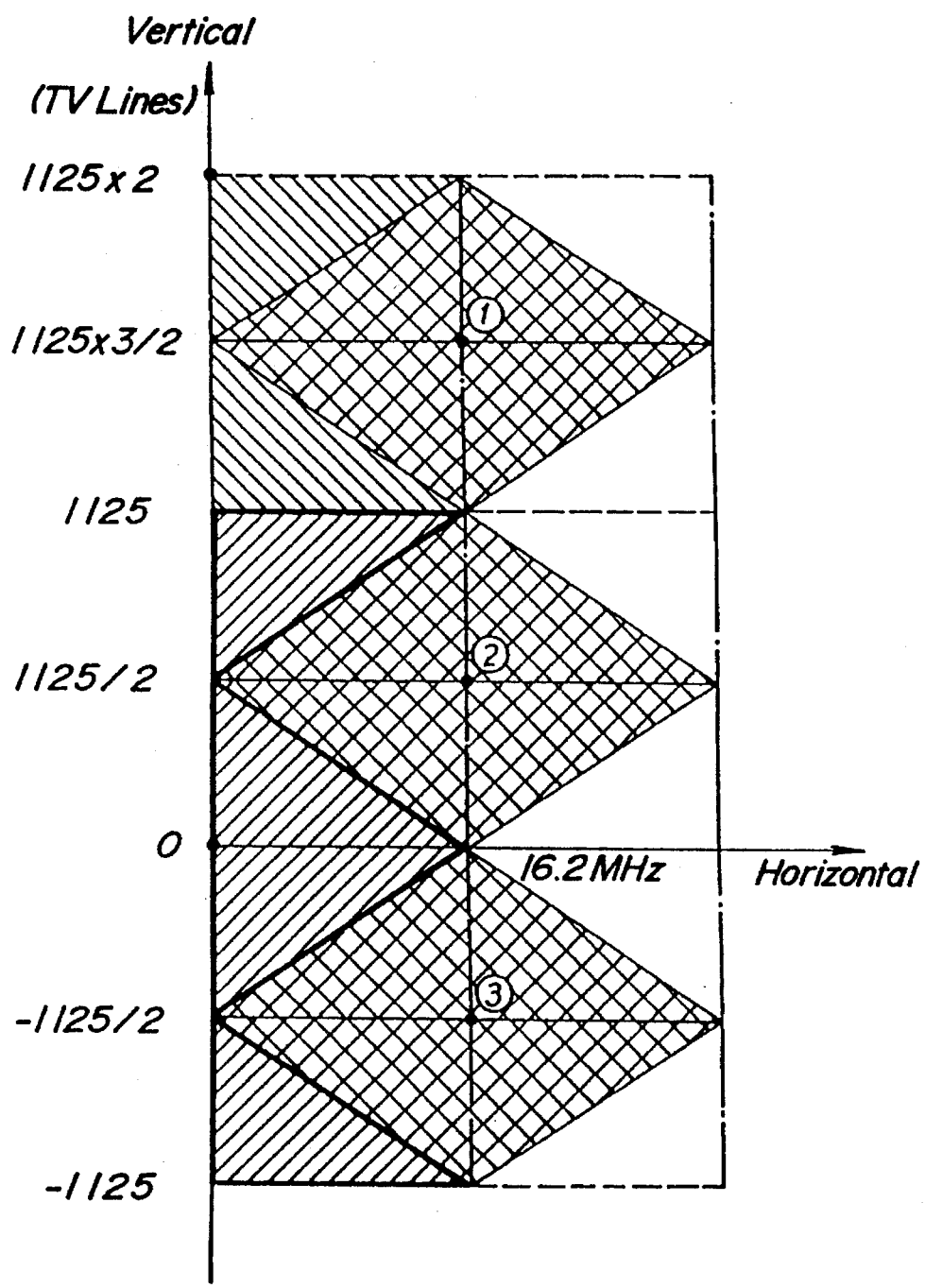
FIG. 4 is a diagram showing a spectrum distribution of an output picture signal of the same sub-sampler.

In a case that the sampled motional picture signal having the above-mentioned spectrum distribution is supplied to the sub-sampler 24 so as to be applied with line-offset sub-sampling, the spectrum distribution concerned becomes as shown in FIG. 4. That is, in a case that it is assumed that the original picture signal contains high resolution signal components which exceed 1125/2 TV lines in the vertical frequency region and hence can be expressed only in a stationary picture, vertical frequency signal components which are turned-over at sampling carriers as shown by circular marks ① and ③ in FIG. 4 and hence exceed 1125/2 TV lines, are formed in a lozenge-shaped spatial frequency region ② as shown in FIG. 4.

The above-mentioned aliasing signal components, which are formed on the transmitting end of the motional picture signal transmitting and processing system arranged as shown in FIG. 2, are removed through the interpolation filter 25 on the receiving and reproducing end, so that theoretically these components do not appear in the reproduced motional picture as distortion and hence should not be questionable. However, in the hardware, which practically constitute the signal processing system, including the pre-filter 26 for removing undesired signal components and the interpolation filter 25 for interpolating desired signal components, it is difficult to realize a perfectly theoretical characteristic. So that, the aforesaid aliasing signal components, particularly those which are turned-over on the horizontal frequency axis and further into the vicinities of odd multiples of vertical frequency 1125/2 TV lines on the vertical frequency axis, cannot be perfectly removed and hence appear in reproduced motional picture as the aliasing distortion. Accordingly, these signal components cause the flicker having the frequency 15 Hz, that is, one half of the frame frequency, and, as a result, extremely deteriorate the reproduced picture quality. So that, the removal of this aliasing distortion has been a conventional problem to be solved.

According to the present invention, the aforesaid problem is solved as follows.

Figure 5:
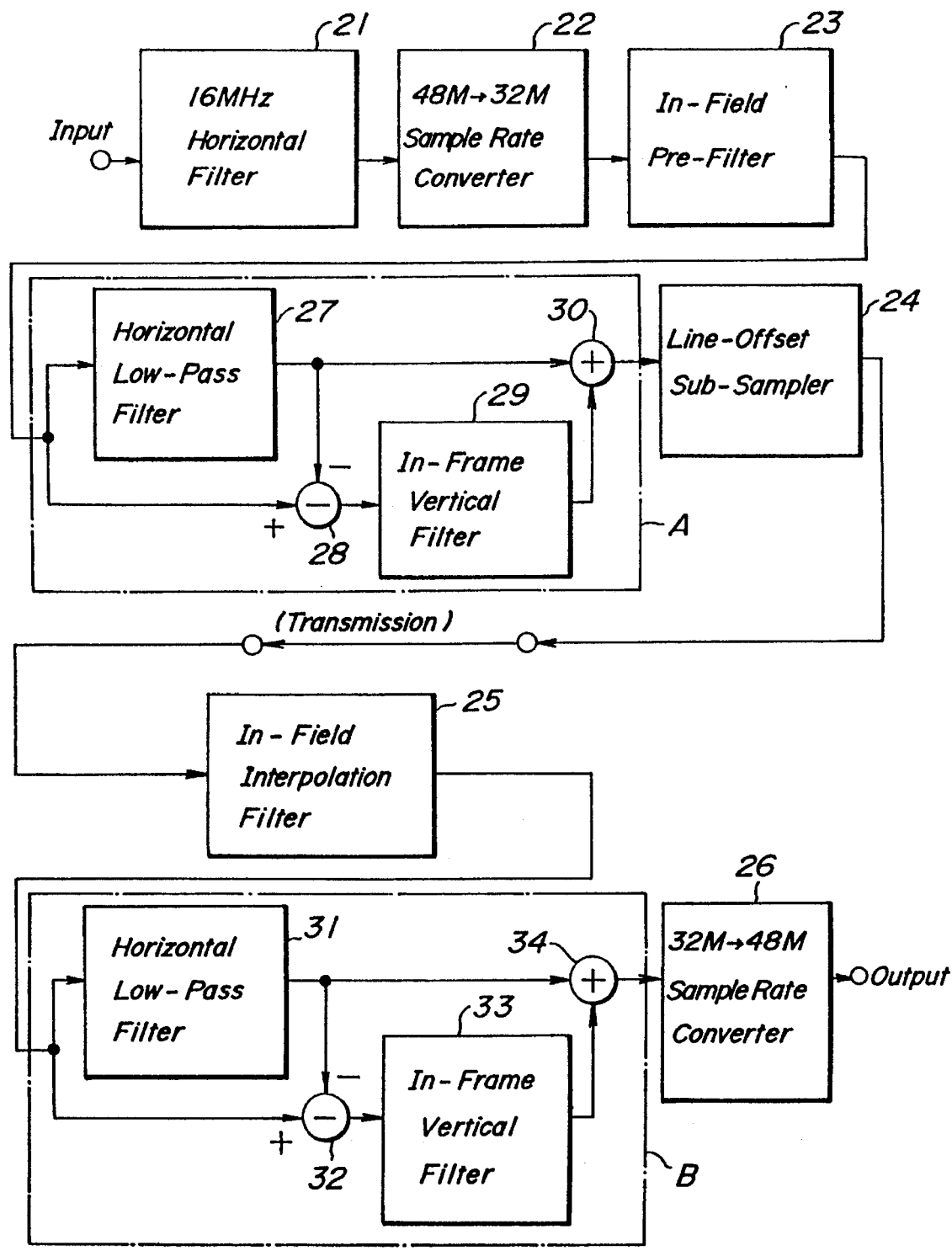
FIG. 5 is a block diagram showing an exemplified arrangement of a picture signal sub-sample transmission system according to the present invention.

An example of the arrangement of the signal processing system comprising the encoder on the transmitting end and the decoder on the receiving end is shown in FIG. 5, as readily compared with the conventional one as shown in FIG. 2.

The arrangement of the signal processing system according to the present invention as shown in FIG. 5 is formed by inserting spatial frequency filters A and B arranged as shown by surrounding with chain lines in the conventional arrangement as shown in FIG. 2.

Figure 3:
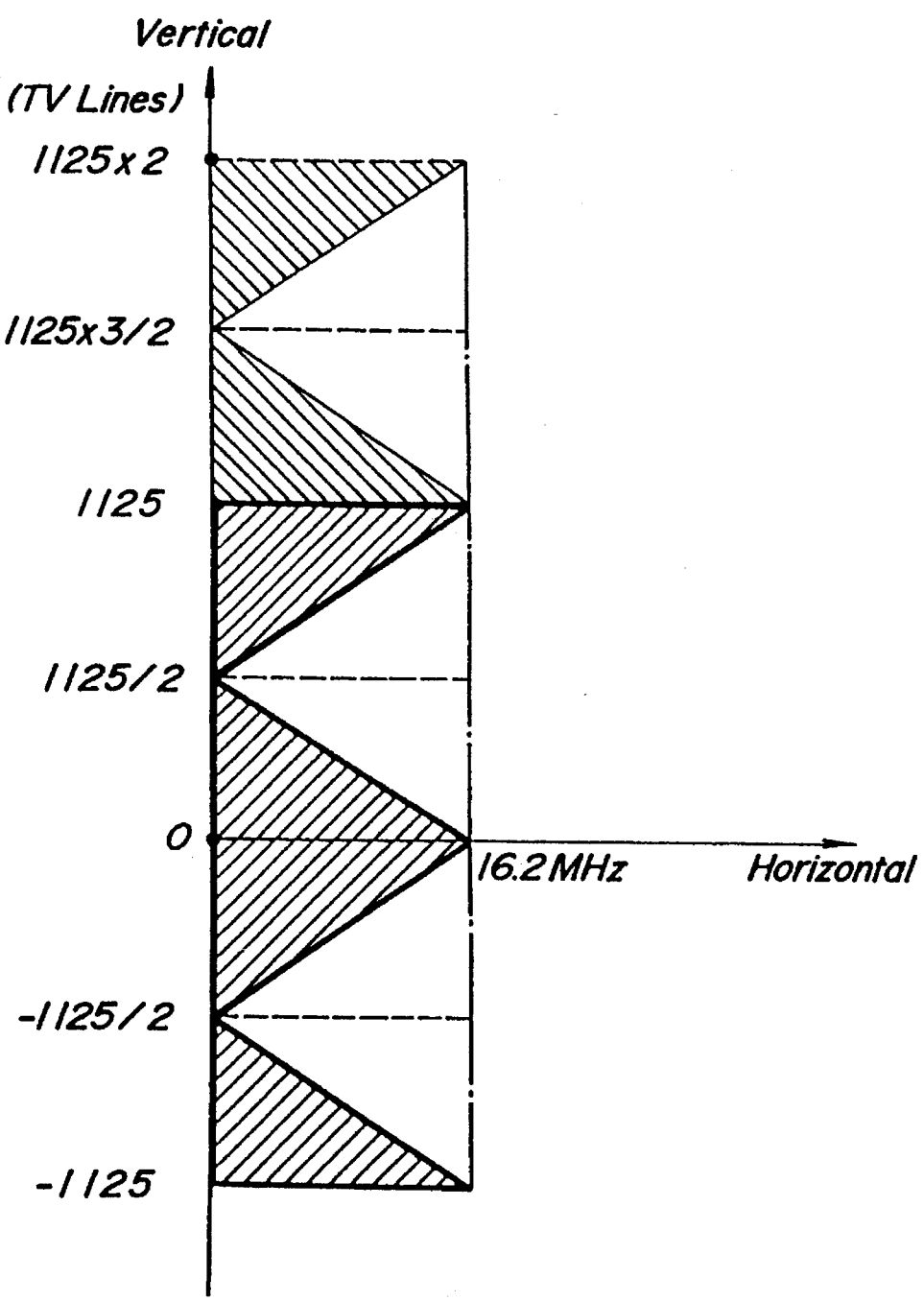
FIG. 3 is a diagram showing a spectrum distribution of an input picture signal of a line-offset sub-sampler in the same conventional transmission system.
Figure 6:
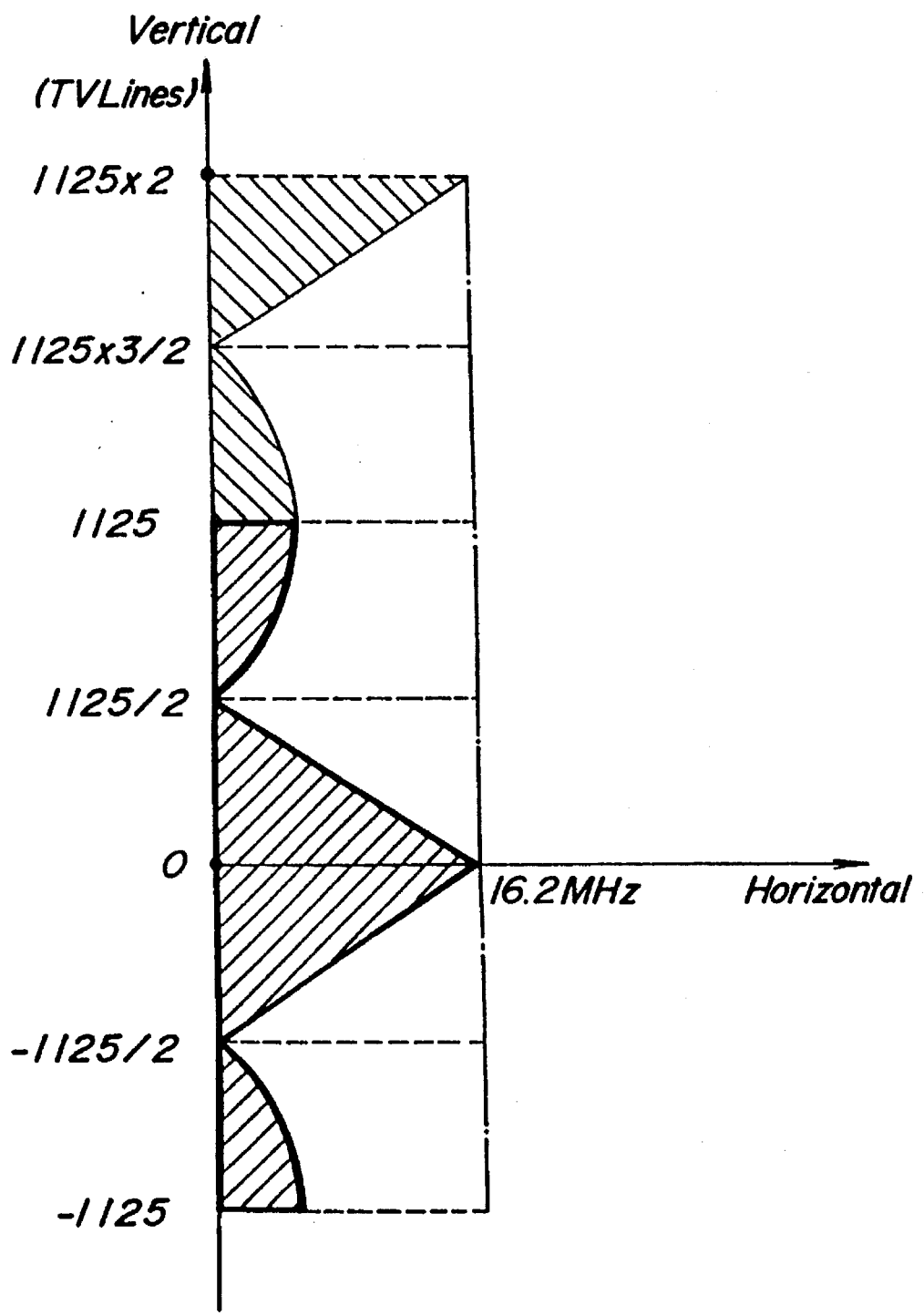
FIG. 6 is a diagram showing a spectrum distribution of an input picture signal of a line-offset sub-sampler in the same sub-sample transmission system.
Figure 7:
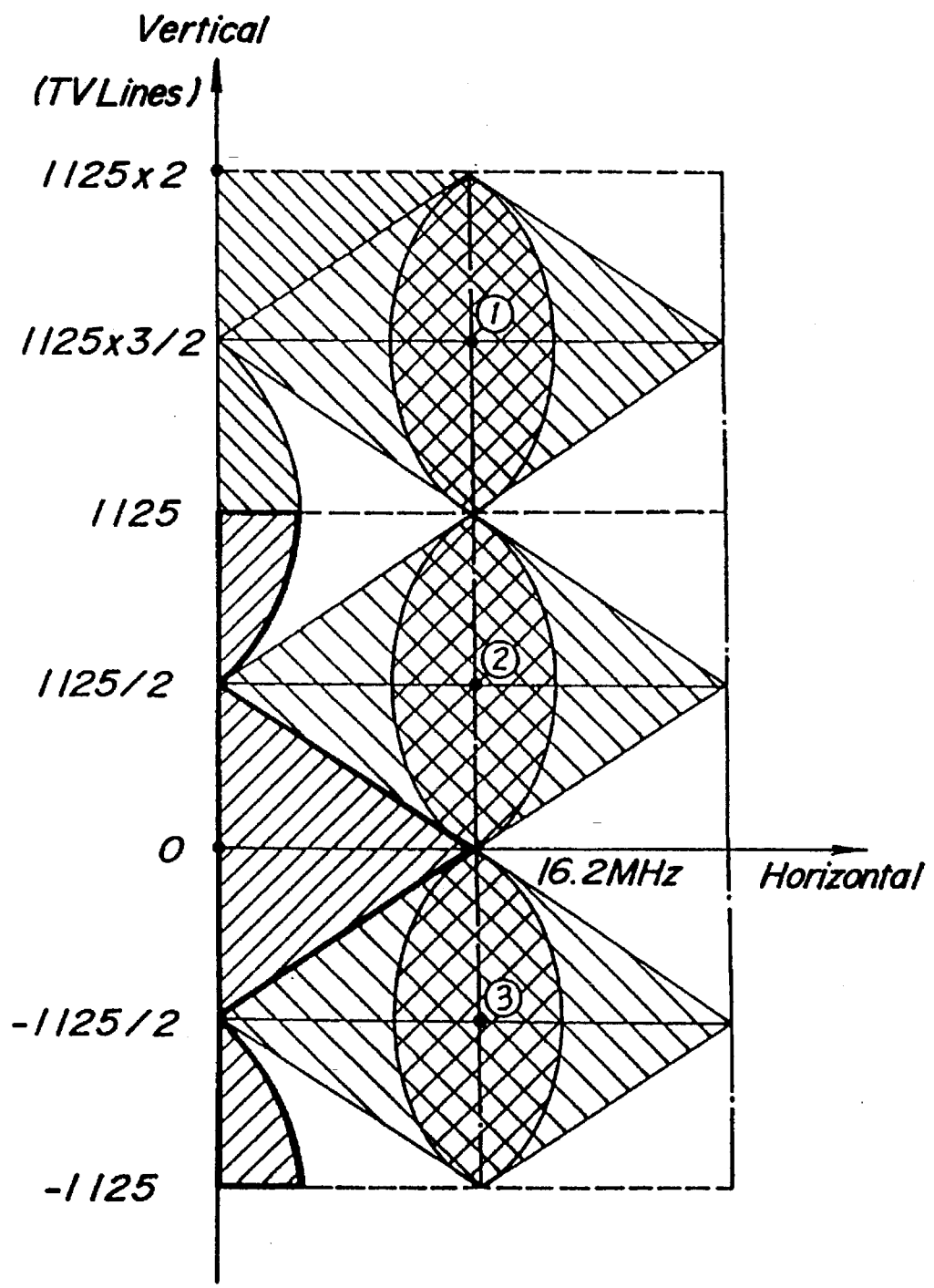
FIG. 7 is a diagram showing a spectrum distribution of an output picture signal of the same sub-sampler.

In the signal processing system according to the present invention as shown in FIG. 5, a band-limited and sampled motional picture signal derived from the in-field pre-filter 23 is supplied to a horizontal low-pass filter 27 included in the spatial frequency filter A, so as to supply a lower range horizontal frequency components derived therefrom (e.g. below 8.1 MHz corresponding to one half of the transmission sample frequency 16.2 MHz) to a subtracter 28. Meanwhile, an input signal of low-pass filter 27 is directly supplied to a subtracter 28, so as to form an equivalent horizontal high-pass filter; higher range horizontal frequency components derived therefrom being supplied to an in-frame vertical filter 29. Filter 29 removes higher-range horizontal frequency components generated by a turn-over axis at the vertical frequency 1125 TV lines, existing in the range between vertical frequencies 1125/2 TV lines to 1125×3.2 TV lines, causing the principal aliasing distortion and included in the spectrum distribution as shown in FIG. 3. The output of filter 29 is supplied to an adder 30, so as to be added the filter concerning a lower-range horizontal frequency component derived from the horizontal low-pass filter 27; the resultant filter output of the spatial frequency filter A is supplied to a conventionally arranged line-offset sub-sampler 24. Thus, the spectrum distribution of the sampled motional picture signal supplied to the sub-sampler 24 becomes as shown by dark lines in FIG. 6, because higher-range horizontal frequency components of the base-band signal as shown by dark lines in the conventional spectrum distribution in FIG. 3 are subtracted from the base-band signal concerned. As a result, the spectrum distribution of the motional picture signal for sub-sample transmission becomes as shown in FIG. 7. Accordingly, the lozenze-shaped aliasing component generating regions individually surrounding each sampling carriers ①, ②, ③ as shown by black dots in the spectrum distribution as shown in FIG. 4 are restricted into elliptical regions in the vicinities of each sampling carriers. Particularly, signal components in the vertical frequency regions of vertical frequencies 1125/2 TV lines to 1125×3/2 TV lines, which conventionally caused principal aliasing distortions, become turned over on the vertical frequency axis in the vicinity of vertical frequency 1125/2 TV lines, so that the aliasing distortion appearing in reproduced motional picture is substantially removed. As a result, a stable reproduced motional picture saved from conventional 15 Hz flicker can be obtained. In this connection, it is preferable to select the upper limit of the pass band of the horizontal low-pass filter 27 to be between 4 MHz and 8 MHz.

In the motional picture signal processing system for sub-sample transmission according to the present invention, as shown in FIG. 5, in the receiving and reproducing end also, the spatial frequency filter B, which is arranged and operated similarly to that in the transmitting end, comprises a horizontal low-pass filter 31, a subtracter 32, an in-frame vertical filter 3 and an adder 34. Spatial frequency filter B is inserted, so as to repeatedly remove aliasing distortion causing signal components which are feared to be generated during the transmission similarly as in the transmitting end.

On the other hand, a frequently used method for transmitting a picture signal through a narrow-band is a sample transmission system in which all picture information included in the picture signal are not minutely transmitted, but only sample values thereof, which are selected at suitable intervals, are transmitted, while, in the receiving and reproducing thereof, suitable signal values are interpolated between those sample values, so as to restore substantially the entire picture information of the original picture signal. As aforesaid, as for the method for sampling the picture signal, other than the temporal sampling in which one sheet, that is, one frame or one field of picture is successively transmitted at a suitable interval, and, the spatial sampling in which a sheet, that is, one frame of picture is formed of scanning lines, the method of sub-sampling, in which picture informations on each scanning lines are tempo-spatially sampled, is widely used. Among various methods of sub-sampling, the field-offset sub-sampling and line-offset sub-sampling, in which the signal processing is brief and ready, are particularly frequently used. According to the field-offset sub-sampling, positions of sample points on scanning lines are alternately shifted between odd and even fields composing one frame, so as to halve the number of samples per one field in a state in which the number of samples per one frame is maintained. On the other hand, according to the line-offset sub-sampling, positions of samples on scanning lines are alternately shifted between adjacent scanning lines composing one frame or one field.

According to the field-offset sub-sampling, as for the stationary picture, because the interpolation can be effected between any adjacent two fields, it is possible to reduce the amount of transmitted sample values without lowering definition by the signal processing of simple interpolation, so that the reproduced picture quality of the stationary picture according to the field-offset sub-sampling is superior to that according to the line-offset sub-sampling. Meanwhile, as for the motional picture, because the picture contents are different from each other between adjacent two frames, it is impossible to effect the interpolation between any adjacent two fields, the reproduced picture quality of the motional picture according to the field-offset sub-sampling is inferior to that according to the line-offset sub-sampling. However, the present inventors found the fact that, when any appropriate inter-field signal processing is effected, it is possible to obtain the reproduced picture quality exceeding a certain level, even if field-offset sub-sampling is applied on the motional picture.

Figure 8:
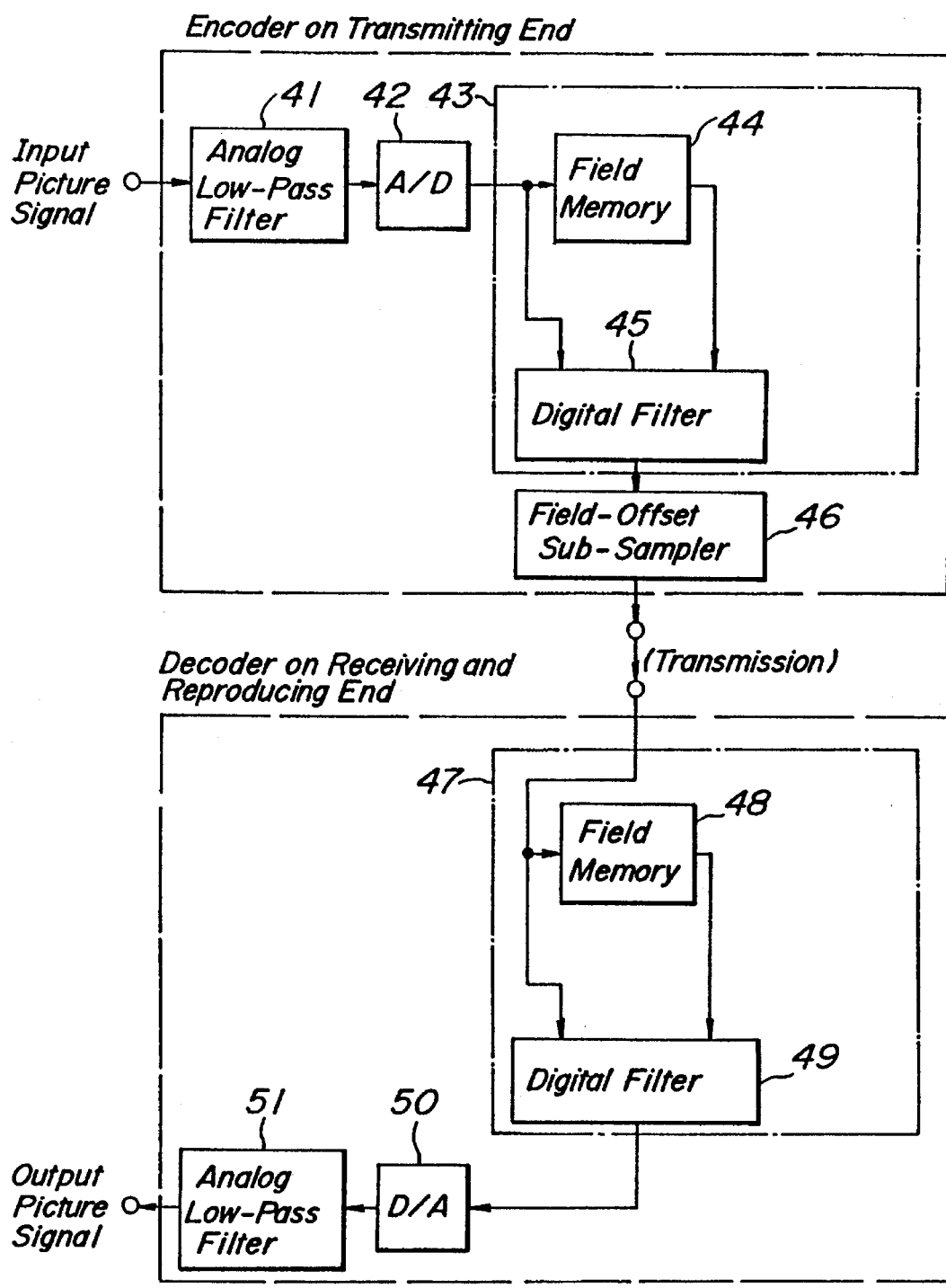
FIG. 8 is a block diagram showing an arrangement of a signal processing system in the conventional picture signal sub-sample transmission system.

At the outset, FIG. 8 shows an outlined arrangement of essential portions in the conventional signal processing system for sub-sample transmission. In the conventional arrangement as shown in FIG. 8, an input picture signal is supplied to an encoder on the transmitting end, in which the input picture signal is supplied to an analog to digital (A/D) converter 42, after the band width thereof is restricted through an analog low-pass filter 41. A resultant digital picture signal, digitized by a sample frequency generally adapted to the sub-sample transmission, is supplied to an inter-field pre-filter 43 (surrounded by a dotted line), so as to apply thereon a band limitation for removing higher-range signal components which cause aliasing distortion in the reproduced picture in response to the sampling of the picture signal so as to previously suppress the occurrence thereof.

In other words, in the conventionally arranged inter-field pre-filter 43, as shown in FIG. 8, picture signals in adjacent two fields, which are spaced from each other by one field interval between an input and an output of a signal field memory 44, are supplied to a digital filter 45 composed, for instance, of a transversal filter, so as to apply the filtering action for effecting the aforesaid band-limitation thereon and supply a resultant output picture signal derived from the inter-field pre-filter 43 to a field-offset sub-sampler, 46 for applying the sub-sampling which is offset between odd and even fields, and then to forward the concerned picture signal to a transmitting path.

On the other hand, in the decoder on the receiving and reproducing end, the aforesaid sub-sample transmitted picture signal is supplied to an inter-field post-filter 47, shown with a chain line, so as to be applied with the interpolation of sample values between adjacent fields.

In other words, in the conventionally arranged inter-field post-filter 47, similar to the inter-field pre-filter 43 on the transmitting end, picture signals in adjacent two fields, which are spaced from each other by one field interval between an input and an output of a single field memory 48, are supplied to a digital filter 49, so as to be interpolated with sample values which are offset between adjacent two fields. A resultant output picture signal of the interfield post-filter 47 is supplied to a digital-to-analog (D/A) converter 50, so as to be restored to the analog picture signal and to be derived therefrom after unnecessary higher range components are removed therefrom.

In the conventionally arranged signal processing system as shown in FIG. 8, both the inter-field prefilter 43 and the inter-field post-filter 47 respectively effect the filtering action for the band limitation and the interpolation between picture signals of adjacent fields, so that the filtering action is always effected between a present field and an immediately preceding field. Thus, as a basic principle, the filtering action for the band limitation on the transmitting end and that for the interpolation on the receiving and reproducing end are carried out in the same state in co-operation with the transmitting end and the receiving end through respective filters having the same arrangement. The greater deviation from this basic principle, the more difficult faithful restoration becomes.

Figure 9:
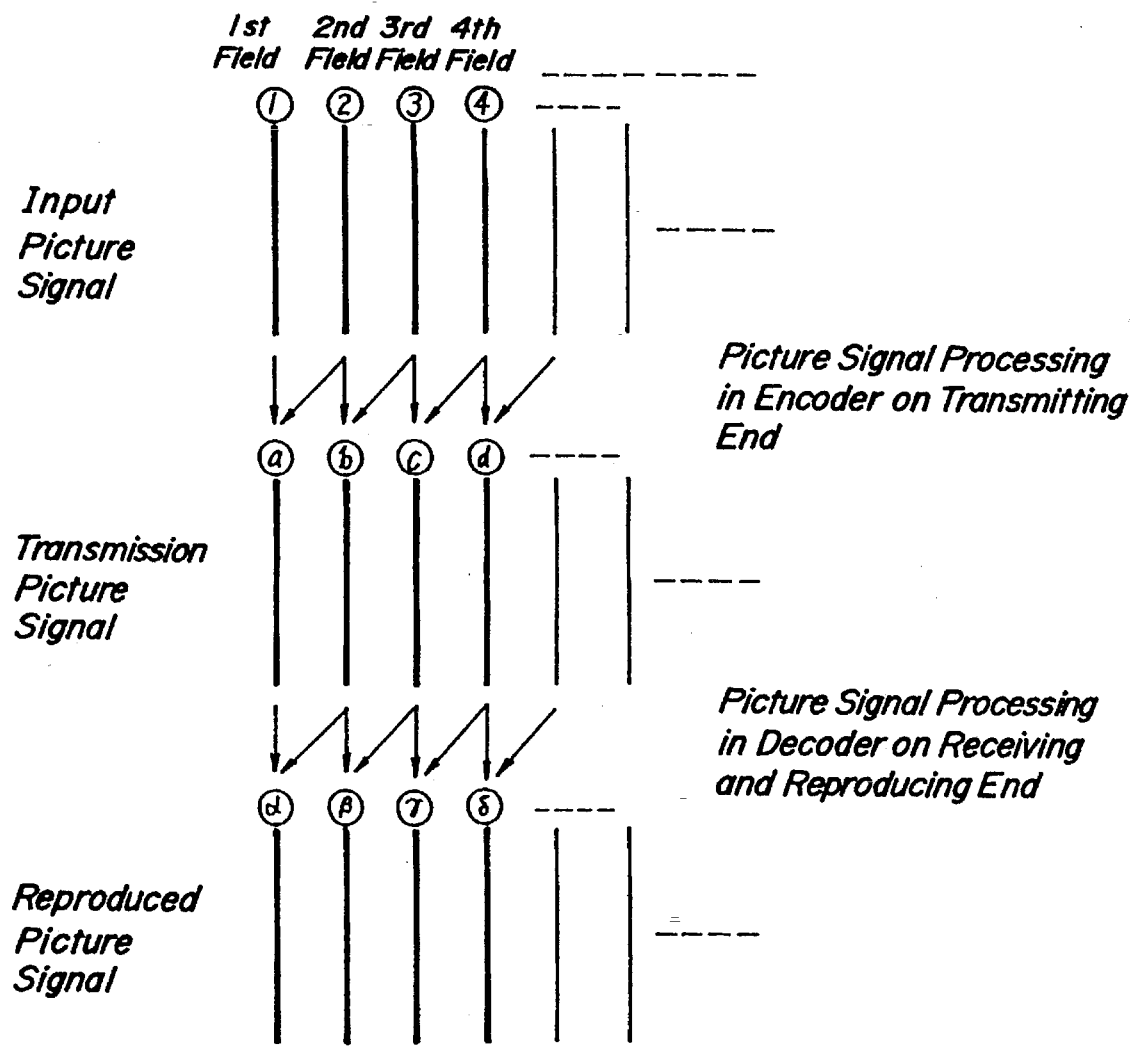
FIG. 9 is a diagram showing a manner of signal processing in the same conventional signal processing system.

However, in the conventionally arranged signal processing system as shown in FIG. 8, because as described above, the filtering action is effected on both the transmitting end and the receiving end always between the present field and the immediately preceding field, as shown in FIG. 9, in the transmitting end, each picture signals of successive transmission fields a, b, c, d, - - - , which consist respectively of each picture signals of successive input fields ①, ②, ③, ④, individually applied with the aforesaid filtering action, are formed of respective combinations of each picture signals of successive two input fields ① and ②, ② and ③, ③ and ④, ④ and - - - , while, in the receiving and reproducing end, each picture signals of successive reproduction fields α, β, γ, δ, - - - are formed of respective combinations of each picture signals of successive two transmission fields a and b, b and c, c and d, d and - - - . Consequently, through the entire signal processing system, each picture signals of successive reproduction fields α, β, γ, δ, - - - are formed of respective combinations of each picture signals of successive three input fields ① and ② and ③, ② and ③ and ④, ③ and ④ and - - - , so that, throughout the entire signal processing system, respective picture information of the input and the output picture signals do not correspond to each other. Particularly, in the motional picture in which picture information of every frame varies moment by moment, the above each of correspondence between input and output picture information directly causes the picture quality deterioration.

Figure 10:
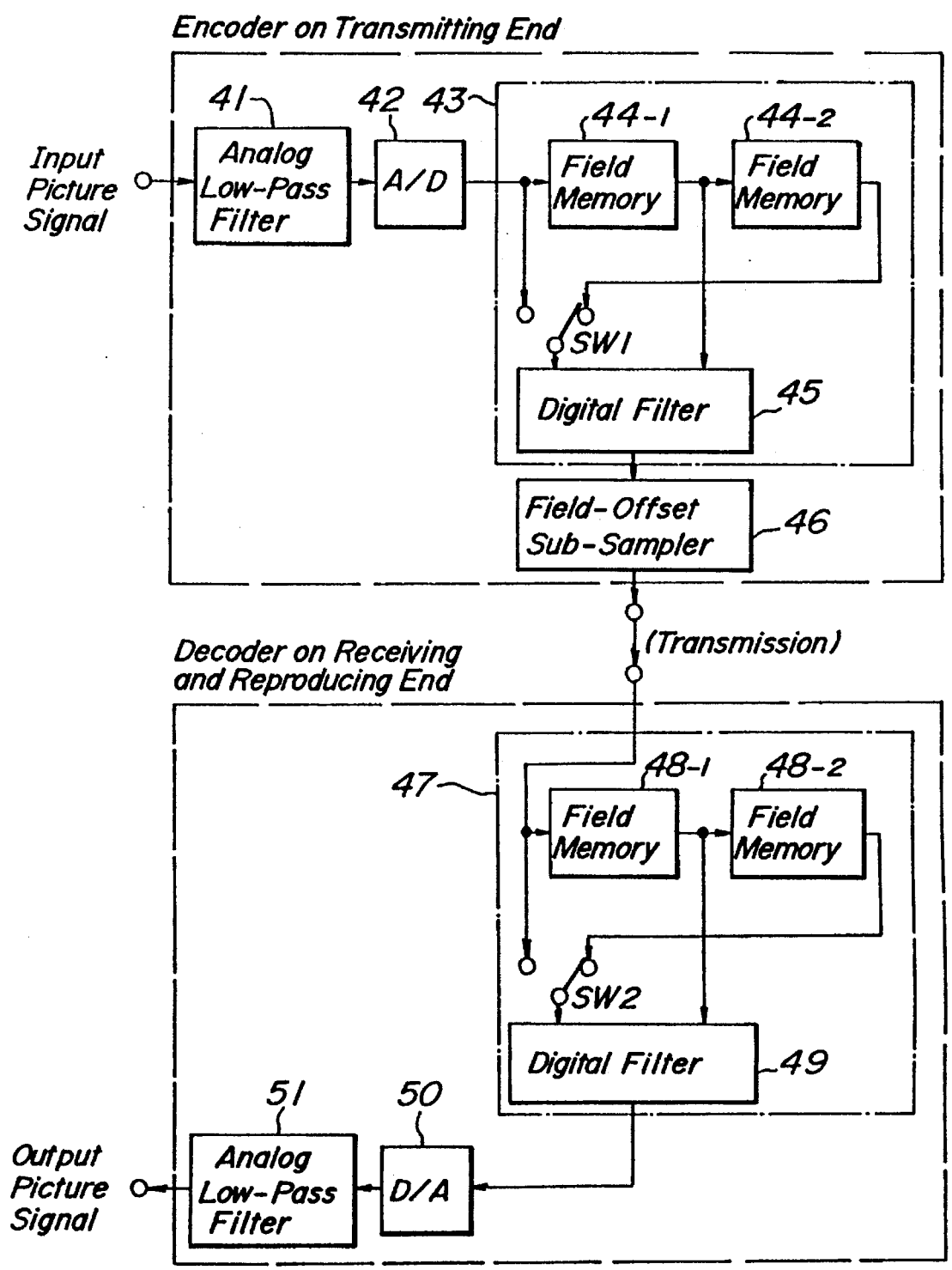
FIG. 10 is a block diagram showing an exemplified arrangement of a signal processing system in a picture signal sub-sample transmission system according to the present invention.

An outlined arrangement of essential portions of the signal processing system according to the present invention for preventing the picture quality deterioration of reproduced motional picture is shown in FIG. 10 by referring to the conventional arrangement as shown in FIG. 8. As is apparent from the comparison between FIGS. 10 and 8, as for the difference or the improvement of the signal processing system as shown in FIG. 10 according to the present invention in comparison with the conventional system as shown in FIG. 8, single field memories 44 and 48 conventionally provided in the pre-filter 43 of the transmitting end and in the post-filter 47 of the receiving end respectively are replaced respectively with two serially-connected field memories 44-1, 44-2 and 48-1, 48-2. In this connection, as for the picture signals of adjacent two fields, which were always conventionally individually derived from inputs and outputs of single field memories 44 and 48, when the present field existing at the inputs of the pre-filter 43 and the post-filter 48 is an odd field, picture signals of odd and even fields, which compose one frame preceding by one frame interval at the inputs and the outputs of the field memories 44-2 and 48-2, are derived as those of conventional adjacent two fields, while when the above-mentioned present field is an even field, picture signals of odd and even fields, which compose one frame the inputs and the outputs of the field memories 44-1 and 48-1, are derived as those of conventional adjacent two fields. Thus, the picture signals of the combined odd and even fields, which are alternately changed at every field interval, are supplied to the digital filters 45 and 49 respectively under the alternate change of changing switches SW1 and SW2.

Figure 11:
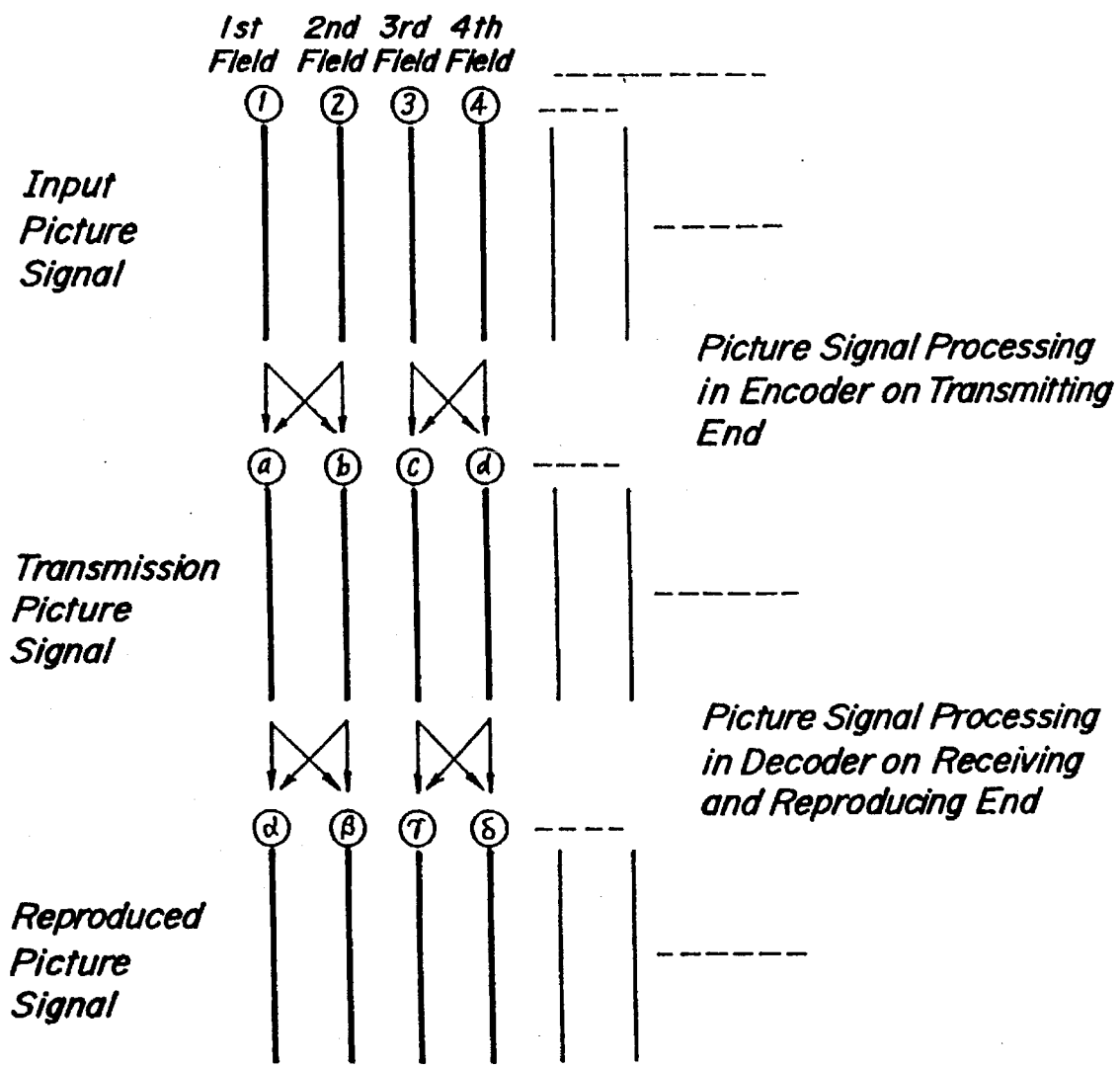
FIG. 11 is a diagram showing a manner of signal processing in the same signal processing system.

Consequently, in the signal processing system according to the present invention, in both of the transmitting end and the receiving end, the filtering action for the band limitation and the interpolation is completed within every one frame interval of odd and even fields composing one frame in the mutual correspondence between the transmitting and the receiving ends. So that, as shown in FIG. 11 similarly as conventionally shown in FIG. 9, on the transmitting end, respectively combined picture signals of successive two input fields ① and ②, ③ and ④, - - - are applied with the filtering action, so as to form each picture signals of successive two transmission fields a and b, c and d, - - - , while, on the receiving and reproducing end, respectively combined picture signals of successive two transmission fields a and b, c and d, - - - are applied with the filtering action, so as to form each picture signals of successive two reproduction fields α and β, γ and δ, - - - . So that, through the entire signal processing system, each picture signals of successive two reproduction fields α and β, γ and δ, - - - , in correspondence to successive two transmission fields a and b, c and d, - - - on the transmitting end respectively, form respectively combined picture signals of successive two input fields ① and ②, ③ and ④, - - - , so that it is possible to raise the picture quality of reproduced motional picture.

In this connection, although the reproduced picture quality a stationary picture according to the field-offset sub-sampling is superior to that according to line-offset sub-sampling, as for motional picture, the picture contents are different from each other between adjacent frames, so that it is impossible to effect the interpolation between any adjacent fields. Consequently, under consideration of the aforesaid fact that the reproduced picture quality of motional picture according to field offset sub-sampling is inferior to that according to the line-offset sub-sampling, the sampling transmission for the stationary picture or the stationary picture region included in the same one picture is applied with the field-offset sub-sampling, while that for the motional picture or the motional picture region included in the same one picture is applied with the line-offset sub-sampling. Thus, a mixed sub-sample transmission system including so-called MUSE-T system, in which, under the control of a motion signal expressing the picture motion specially detected as for the picture concerned, both of the aforesaid sub-sampling are changed to each other in adaptation to the existence of the picture motion, has been conventionally developed.

However, in the above mixed sub-sample transmission system, it is required to obtain the motion signal for respectively controlling the above adaptive change on the transmitting and the receiving ends, to individually effect the detection of picture motion on both ends or to transmit the motion signal expressing the picture motion detected on the transmitting end to the receiving end together with the sampled picture signal. In addition, it is required to provide two signal processing systems for stationary and motional pictures on both the transmitting and the receiving ends respectively, and it is further required to inconspicuously effect the change concerned in case that both stationary and motional picture regions are mixed in the same picture. So that, the respective signal processing arrangements not only become large-scaled, but also many problems such that, when erroneous detections, inadequate changes of signal processing systems and the like are caused, and new picture quality deterioration is caused in the reproduced picture.

In connection with that the improvement of motional picture quality has been described above by referring to FIGS. 10 and 11, as for the stationary picture also, it is possible to effect the signal processing with a desired picture quality, so that, according to the present invention, the aforesaid conventional problem are solved as follows.

The change of signal processing systems and the picture motion detection for the change concerned are obviated by providing only one signal processing system arranged as shown in FIG. 10, and, as a result, it is facilitated to transmit both the motional and the stationary picture regions having respective picture qualities exceeding a certain level also, although the signal processing system is small-scaled.

In the aforesaid MUSE system which has been developed as a high definition broadcasting system, in order to facilitate the FM transmission through a single satellite broadcasting channel with a band width 27 MHz of a wide band high definition color picture signal comprising a luminance signal with a band 20 MHz and two color difference signals with respective bands 7 MHz, each digitized and adequately sub-sampled signal components are time-compressed and time-divided with respective bands limited below 8 MHz, so as to be transmitted through a narrow band path.

The sub-sample transmission of color picture signal according to this MUSE system uses in principle the offset sub-sampling according to a sampling pattern circulated at every two frames, that is, every four fields. So that, as for the stationary picture region, it is possible to reproduce a required high definition color picture by field-offset sub-sampling effected between successive fields and the interpolation for the reproduction thereof, while, as for the motional picture region, because the picture contents differ from each other between adjacent frames in response to the picture motion, the line-offset sub-sampling within the same field and the interpolation in the reproduction thereof are conventionally and principally employed.

Accordingly, since the picture information amount interpolated in the motional picture region is remarkably smaller than that in the stationary picture region, the definition of the reproduced color picture in the motional picture region is originally lowered, so that, as for the motional picture region, the base band of the color difference signal is conventionally limited substantially within 4 MHz.

According to the present invention, the aforesaid conventional problem is solved as follows, so as to increase the picture information amount interpolated in the reproduction of the sub-sampled picture signal and to improve the reproduced picture quality of the motional color picture through the spread of frequency band of the color difference signal.

Figure 12:
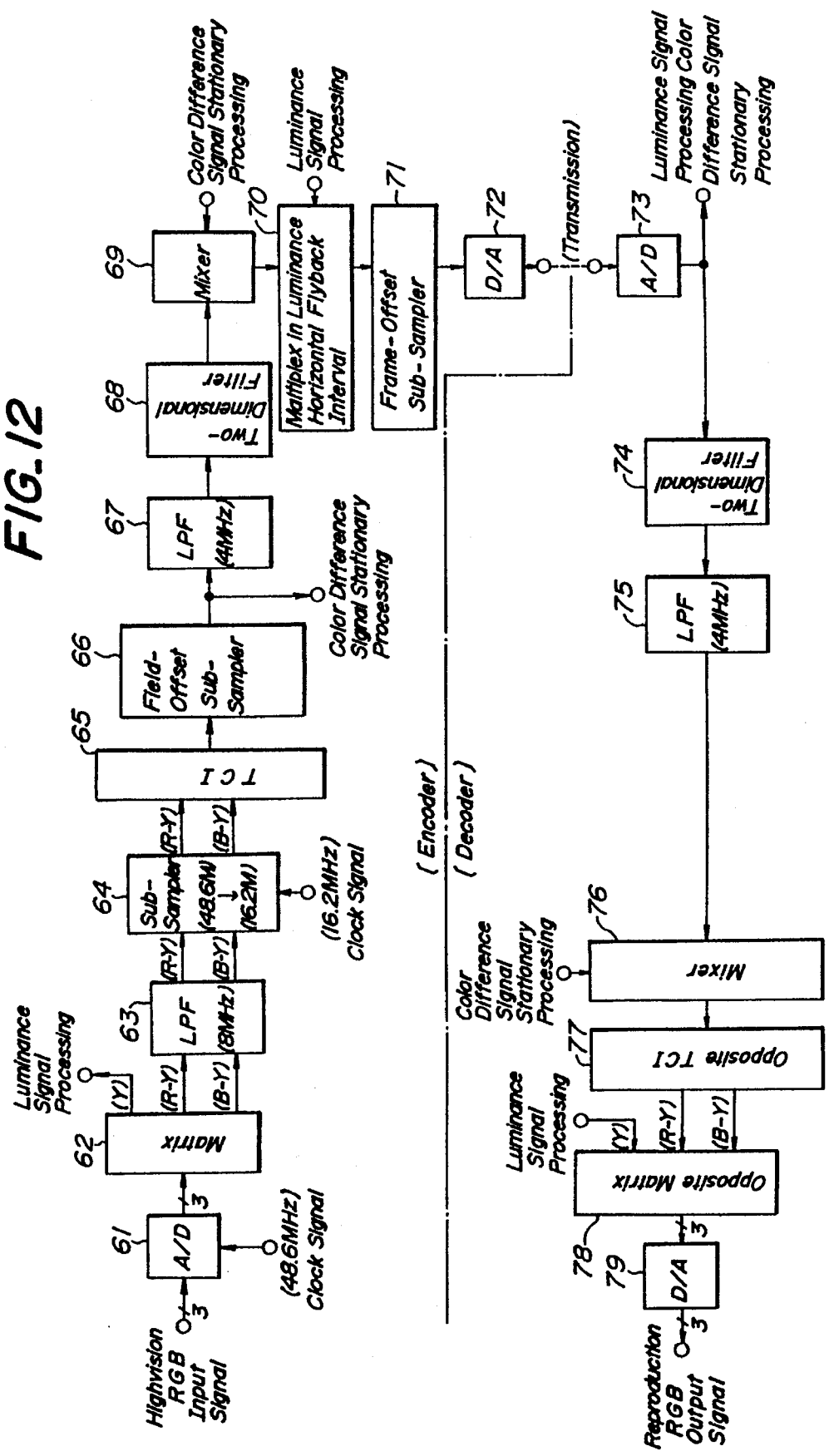
FIG. 12 is a block diagram showing an arrangement of a sub-sample transmission system for a color picture signal according to a conventional system.

At the outset, a conventional arrangement of a color difference signal processing system for effecting sub-sample transmission of color difference signals in the motional picture region of the MUSE system color picture signal, which comprises an encoder and a decoder, is shown in FIG. 12. In the encoder for processing the color difference signal according to the conventional arrangement as shown in FIG. 12, pick-up output primary color picture signals R, G, B of the high-definition color picture signal, that is, so-called high-vision signals are supplied to an analog-to-digital (A/D) converter 61, so as to be digitized by a clock signal of 48.6 MHz, and then supplied to a matrix circuit 62, so as to form a luminance signal (Y) and color difference signals (R–Y), (B–Y). The color difference signals (R–Y) and (B–Y) included in a matrix output, from which the luminance signal (Y) to be separately processed is removed, is supplied to a sub-sampler 64, through a low-pass filter (LPF) 63 having an upper limit of pass band 8 MHz, so as to apply horizontal direction sub-sampling thereon under the control of the converted clock frequency 16 MHz. A resultant alternately line-sequential sample sequence of two color difference signals (R–Y), (B–Y) is supplied to a TCI circuit 65 so as to have the time axis compression and the time-divisional multiplication applied thereon and hence to be converted into a form of time-sequential signal which can be multiplexed in the horizontal fly-back interval of the luminance signal.

In the conventionally arranged color difference signal encoder, the above sample sequence of color difference signals is supplied to a field-offset sampler 66, so as to halve the sample rate to 8.1 MHz through inter-field offset. Thereafter, under the control of a non-illustrated usual picture motion detection output, the sample sequence of color difference signals in the stationary picture region is separately processed, while the sample sequence of color difference signals having the sample rate 8.1 MHz in the motional picture region is supplied to a low-pass filter (LPF) 67, so as to limit the frequency band thereof to 4 MHz and further is supplied to a two-dimensional filter 68, so as to limit the horizontal and vertical spatial frequency region thereof.

As for the sample sequence of color difference signals in the motional picture region, which has been applied with the range limitation by the conventional arrangement as shown in FIG. 12, according to the alternately line-sequential signal form of the color difference signal in the MUSE system color picture signal and the sample rate 8.1 MHz, the positions of sub-sample carriers in the spatial frequency region are situated at 1125/2 TV lines interval in the vertical direction and at 8 MHz interval in the horizontal direction. The color difference signal transmissible spatial frequency region which is thus restricted by a segmental line connecting the midpoints of sub-sample intervals, is shaped, as shown in FIG. 13, as a triangle having three vertexes of the coordinate origin, a point 1125/4 TV lines on the vertical axis and a point 4 MHz on the horizontal axis.

Figure 13:
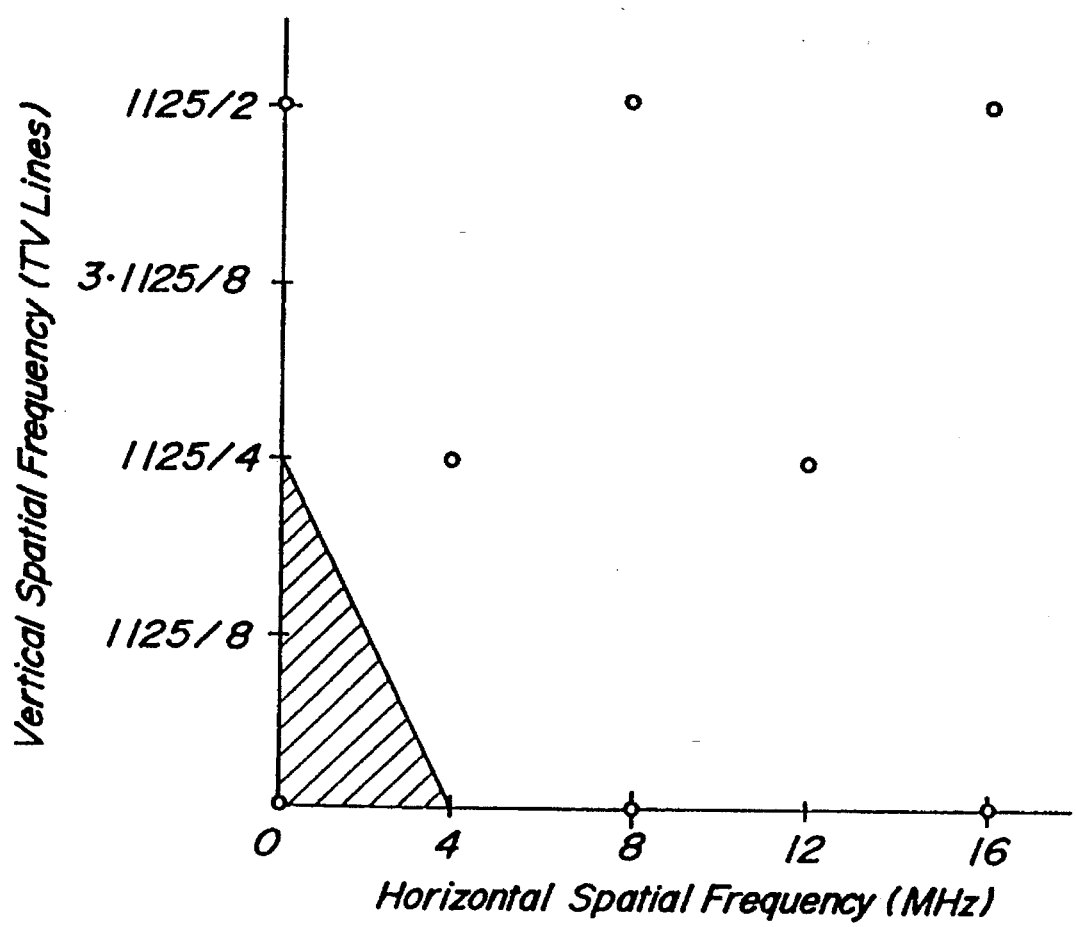
FIG. 13 is a characteristic curve showing a transmissible spatial frequency band of a color difference signal in a motional picture region in the same sub-sample transmission system.

In this connection, FIG. 13 and subsequent similar drawings, FIG. 15 and FIGS. 17 to 20 are illustrated as for the picture signal in a line sequential form.

Thus band-limited sample sequencies of color difference signals in the motional picture region are supplied to a mixer 69, so as to be mixed with those in the stationary picture region which are separately processed, a resultant mixed output color difference signal being supplied to a multiplex circuit 70, so as to be multiplexed in the horizontal fly-back interval of the luminance signal separately processed.

Thereafter, this sample sequence of the color difference signal is supplied to a frame-offset sub-sampler 71, so as to be converted into the sample pattern circulated at every two frames which is the form of MUSE system sub-sample transmission, and to be analog-transmitted through a digital-to-analog (D/A) converter 72.

On the other hand, in the conventionally arranged decoder for processing color difference signals, signal processing, which is opposite to that in the aforesaid encoder, is effected so as to reproduce the primary color signals R, G, B. In other words, the aforesaid analog-transmitted sub-sample sequence of color difference signals, which is time-axis compressed and time-divisionally multiplexed, is supplied to an analog-to-digital (A/D) converter 73, so as to be re-converted into a digital signal. The converted output sub-sample sequence is applied with switching, so as to separate the luminance signal and the color difference signal in the stationary picture region therefrom and to separately process these signals respectively similarly as in the encoder. Meanwhile, the color difference signals in the stationary picture region are successively supplied to a two-dimensional filter 74 and a low-pass filter (LPF) 75 having an upper limit 4 MHz, so as to apply thereon the interpolation for the sub-sample sequence according to the same limitation as in the encoder, and then supplied to a mixer 76, so as to be mixed with the sub-sample sequence of color difference signals in the stationary picture region which are separately processed. The resultant mixed output sub-sample sequence of color difference signals is supplied to an opposite TCI circuit 77, so as to restore the time-axis compressed and time-divisionally multiplexed sub-sample sequence of color difference signals into the original signal form. The color difference signals (R–Y), (B–Y) derived therefrom are supplied to an opposite matrix circuit 78, so as to be restored together with the separately processed luminance signal into the original form of the primary color signals R, G, B and to be derived as a reproduced output through a digital-to-analog (D/A) converter 79.

In contrast with the aforesaid conventionally arranged color difference signal processing system, an example of that which is improved by the present invention so as to expand the transmissible spatial frequency range in the motional picture region is shown in FIG. 14, which is similarly arranged as FIG. 12 showing the conventional arrangement, with the same marks applied on the same blocks as in FIG. 12, respectively.

As is apparent from the comparison between FIGS. 12 and 14, the different points between the arrangement of the present invention and the conventional arrangement are only circuit blocks $81_R$, $81_B$, $82_R$, $82_B$, $83_R$, $83_B$ for limiting frequency ranges and the arrangement of the TCI circuit 65 in the encoder, and, circuit blocks $85_R$, $85_B$, $86_R$, $86_B$, $87_R$, $87_B$ for the interpolation, the new establishment of an in-frame interpolation circuit 84 and an interpolation filter 88 and the arrangement of the opposite TCI circuit 77 in the decoder. The other circuit blocks in the arrangement according to the present invention are the same as those in the conventional arrangement; thus, only those different points will be described hereinafter.

In the encoder arranged according to the present invention, the arranged order between the circuit portions for the band limitation and the TCI circuit 65 are changed to each other, so as to parallelly derive sample sequencies at sample rate 16.2 MHz of color difference signals (R–Y) and (B–Y) from the sub-sampler 64, and separate color different signals in the stationary picture region therefrom for separately processing those signals. Meanwhile, color difference signals in the motional picture region are individually supplied to respective band-limiting circuit portions in parallel, so as to process spatial frequency ranges in the vertical direction of the sub-sample sequence at the sample rate 16.2 MHz in the horizontal direction of color difference signals (R–Y), (B–Y) for individually limiting those ranges within 1125/8 TV lines in a form such that the processing is completed within each frame by processing those ranges at every two fields, that is, at every frame.

In other words, sample sequences of color difference signals (R–Y) and (B–Y) are successively supplied to series connections of field memories 81R, $82_R$ and $81_B$, $82_B$ respectively at every field and further to each terminal a of changing switches $SW1_R$ and $SW1_B$ respectively and at the same time, sample sequences of two-fields delayed color difference signals (R–Y) and (B–Y) respectively derived from the field memories $82_R$ and $82_B$ are supplied to each terminal b of the same changing switches $SW1_R$ and $SW1_B$ respectively. These switches $SW1_R$ and $SW1_B$ are simultaneously changed at every field and further switching outputs of these switches and midpoint outputs of the series connections of field memories are supplied to vertical filters 83R and $83_B$ respectively, upper limits of the pass bands of which are 1125/8 TV lines.

Accordingly, as for the explanation, for instance, of the series connection of field memories $81_R$, $82_R$ for supplying the color difference signal (R–Y), successive fields of the color difference signal (R–Y) are marked with #1, #2, #3, #4, #5, - - - , an input terminal of the field memory $81_R$ being marked with ①, a middle terminal of field memories 81R, 82R being marked with ②, an output terminal of the field memory 82R being marked with ③. First, when the switch $SW1_R$ is connected with the terminal a, it is assumed that color difference signals #3, #2, #1 successively appear on each memory terminal ①, ②, ③. In this state, the color difference signals (R–Y) of fields #3 and #2, which appear at memory terminal ① and ② respectively, are supplied to the vertical filter $83_R$. Next, when the switch $SW1_R$ is connected with the terminal b in the subsequent field, the color difference signals (R–Y) of fields #3 and #2, which appear at memory terminals ② and ③ respectively after the successive shift, are supplied again to the vertical filter $83_R$. Consequently, in a state in which it is assumed that fields #2 and #3 compose the same one frame, the vertical filter $83_R$ is always supplied with the color difference signals (R–Y) of two fields composing the same one frame. So that the sample sequence at sample rate 16.2 MHz of color difference signals (R–Y) in successive two fields is applied with the limitation of the vertical spatial frequency range in a form such as it is completed at every frame.

Thus, the limitation of frequency range is applied on the sample sequence of the color difference signal (B–Y) also simultaneously in just the same manner.

The sample sequencies of color difference signals (R–Y) and (B–Y) individually applied with the frequency range limitation at every frame are parallelly supplied to the TCI circuit 65 from the vertical filters $83_R$ and $83_B$ respectively, so as to be converted into an alternately line-sequential signal form, which can be inserted in the horizontal fly-back interval, by applying time-axis compression and time-divisional multiplexing on the sample sequencies of color difference signals (R–Y), (B–Y) having 1125 scanning lines at every frame. As a result, the following mixer 69 is supplied with the time sequential color difference signal in the motional picture region which presents the same signal form as that in the conventional arrangement as shown in FIG. 12. In this connection, the transmissible spatial frequency range becomes as shown in FIG. 15 in a manner as described later and hence is doubled in comparison with that of the conventional arrangement as shown in FIG. 13.

The aforesaid time sequential color difference signal in the motional picture region is applied with the same signal processing as that in the conventional arrangement as shown in FIG. 12 in the stages following the mixer 69 for the transmission thereof. Among those stages, in the frame-offset sub-sampler 71, the inter-field sub-sampling concurrently holding the frame-offset sub-sampling is applied thereon at every frame.

On the other hand, in the decoder for processing the color difference signal which is arranged according to the present invention, after the time-axis compressed time-divisionally multiplexed sub-sample sequence of color difference signal which is analog-transmitted from the encoder is again digitized through the analog-to-digital (A/D) converter 73, the time-sequential color difference signal, from which the luminance signal to be separately processed has been separated, is applied with the signal processing corresponding to that which is effected for the frequency band limitation preventing the aliasing distortion accompanied with the sub-sampling in the encoder, so as to apply the interpolation on the sub-sample sequence of color difference signals.

In other words, the time-sequential color difference signal derived from the A/D converter 73 is supplied to the in-frame interpolation circuit 84, so as to apply thereon inter-field interpolation which corresponds to the inter-field, namely, in-frame offset sub-sampling in the frame-offset sub-sampler 71 in the encoder, in a manner such as it is completed at every frame. Thus in-frame interpolated time-sequential color difference signal is supplied to the opposite TCI circuit 77, so as to release the time-sequential signal form of line sequence of 1125 lines in each frame and hence to restore the signal form of two color difference signals (R–Y) and (B–Y) individually comprising 1125/2 lines in each frame, and thereafter is parallelly supplied to the group of circuit blocks $85_R$, $85_B$, $86_R$, $86_B$, $87_R$, $87_B$ for the interpolation in the vertical direction which are individually arranged just similarly as the vertical frequency range limiting circuit block in the encoder.

In the group of circuit blocks for the interpolation, according to the circuit operation which is the same as the vertical frequency range limitation in the encoder, the interpolation in the vertical direction is effected such that it is completed within every frame. The vertical filters $87_R$ and $87_B$ used for the interpolation concerned are vertical direction low-pass filters (LPF) respectively having the same upper band limit 1125/8 TV lines as those of the vertical filters $83_R$ and $83_B$ in the encoder.

For the convenience of parallel processing of two color difference signal systems, the arrangement order of the circuit for the interpolation and the opposite TCI circuit 77 is exchanged in opposite to that in the conventional arrangement as shown in FIG. 12. The two color difference signals (R–Y) and (B–Y), which are applied with the interpolation in thus opposite order, are parallelly supplied to the mixer 76, so as to be mixed with the separately processed color difference signals in the stationary picture region respectively under the control of the picture motion detection output which is obtained in the decoder or transmitted from the encoder, a resultant mixed output color difference signals (R–Y) and (B–Y) being supplied to the interpolation filter 88 in parallel.

The sample rate in the horizontal direction of color difference signals (R–Y), (B–Y) which are applied with the frequency band limitation and the interpolation in the vertical direction in the color difference signal processing system arranged according to the present invention as shown in FIG. 14 is maintained as lowered from 48.6 MHz to 16.2 MHz in the sub-sampler 64 in the encoder. So that, the mixed output color difference signals (R–Y), (B–Y) of the mixer 76 are supplied to the interpolation filter 88, so as to be applied with the interpolation for converting the respective sample rate from 16.2 MHz to 48.6 MHz. In this connection, this interpolation filter 88 is formed of a low-pass filter having a band upper limit 8 MHz corresponding to the LPF 63 in the encoder. On the other hand, the subsequent signal processing, in which the color difference signals (R–Y), (B–Y) at the sample rate 48.6 MHz are supplied to the opposite matrix circuit 78, so as to be restored in the form of the reproduced output primary color signals RGB by mixing therewith the separately processed luminance signal, is the same as in the conventional arrangement.

The positions and the transmissible spatial frequency range of the sample carriers in the horizontal and vertical two-dimensional spatial frequency range as for the color difference signal sample sequence in the motional picture region in the case that the signal processing according to the present invention is applied on the high definition color picture signal as aforesaid by referring to FIG. 14, are shown in FIG. 15 on the plane in which the frequency on the time axis is set on zero similarly as in FIG. 13 showing the case of the conventional arrangement. In other words, the interval of the sub-sample carrier position in the horizontal direction is maintained as the sub-sample rate 16.2 MHz in the horizontal direction, so that the frequency range in the horizontal direction is extended to one half 8.1 MHz of the sample carrier interval and hence the number of samples which can be used for the signal processing of the interpolation in the decoder is doubled by effecting the signal processing at every frame.

On the other hand, the interval of the sub-sample carrier position in the vertical direction is doubled in comparison with that in the conventional arrangement as shown in FIG. 13, because the signal processing in the vertical direction is effected at every frame comprising two fields, while the upper limit of the frequency range in the vertical direction is contrarily halved to 1125/8 TV lines. So that, after all, the transmissible frequency range in the two-dimensional spatial frequency region becomes as shown in FIG. 15 and hence is doubled in comparison with that in the conventional arrangement as shown in FIG. 13.

In this connection, as for the resolution in the temporal axis direction, because the signal processing is effected at every frame comprising two fields, it is halved in comparison with the conventional arrangement. In general, as for the luminance signal, when the picture signal having the field frequency 60 Hz is applied with the signal processing at every frame, the resolution in the temporal axis direction is halved in correspondence to the resolution 15 Hz, so that the smoothness of motion is lost and hence jutter is caused. However, as for the color difference signal, the human visual susceptibility responding to the lowering of the resolution in the temporal axis direction is deteriorated, so that, even if the resolution in the temporal axis direction of the color difference signal is lowered to 15 Hz by applying the signal processing at every frame thereon, the deterioration of the color picture quality is not visually noticed.

Furthermore, in the present invention, as for the picture signal in the motional picture region, the motion of which is comparatively small, in addition to the application of the inter-field offset sub-sampling, the inter-field signal processing for effecting the frequency range limitation for preventing the aliasing distortion and the interpolation for the reproduction is applied thereon, so as to obtain a reproduced motional picture which has the intermediate resolution between those of the stationary picture, and the motional picture the motion of which is large for further improving the overall quality of the reproduced picture.

Exemplified arrangements of the encoder and the decoder, which are provided by the present invention in the above case, are shown in FIGS. 16(a) and 16(b), respectively.

In the encoder as shown in FIG. 16(a), the luminance signal component of an input color picture signal is supplied to an analog-to-digital (A/D) converter 91, so as to be digitized at a sample frequency 48.6 MHz, and then supplied to a sampling frequency converter 93 through a horizontal direction low-pass filter (LPF) 92 having a band upper limit 16.2 MHz, so as to convert the sampling frequency from 48.6 MHz to 32.4 MHz, a resultant converted output luminance signal being supplied to a sub-sampler 95 through a vertical direction low-pass filter (LPF) 94 having a band upper limit 1125/2 TV lines, so as to have an inter-field offset sub-sampling at the sampling frequency 32.4 MHz applied thereon, and further being supplied to a sub-sampler 97 through a horizontal direction low-pass filter (LPF) 96 having a band upper limit 8.1 MHz, so as to have an interframe and inter-line offset sub-sampling applied thereon for forming a sub-sample transmission signal according to the quincuncial sampling pattern of the MUSE system, which is analog-tranmitted through a digital-to-analog (D/A) converter 98.

On the other hand, in the decoder as shown in FIG. 16(b), the aforesaid sub-sample transmission signal at the sampling frequency 16.2 MHz is supplied to an analog-to-digital (A/D) converter 99, so as to be digitized again, and then is supplied to an inter-field interpolation circuit 100, so as to be applied thereon with an inter-field interpolation according to the signal delivering to and the signal receiving from a field memory 101 for interpolating sample values on positions which have been lacked by the offset sub-sampling, and thereafter is supplied to a sub-sampler 103 through a horizontal direction low-pass filter (LPF) 102 having a band upper limit 8.1 MHz, so as to convert the sampling frequency of the sample sequence applied with the interpolation in the inter-field interpolation from 16.2 MHz to 32.4 MHz, and further thereafter is supplied to a vertical direction low-pass filter (LPF) 104 having a band upper limit 1125/2 TV lines, so as to be applied thereon with the horizontal and vertical direction interpolation. A resultant interpolated sample sequence is supplied to a sampling frequency converter 105, so as to restore the sampling frequency thereof 32.4 MHz into the original sampling frequency 48.6 MHz, a resultant restored output signal being derived as a reproduced output luminance signal successively through a horizontal direction low-pass filter (LPF) 106 having a band upper limit 16.2 MHz and a digital-to-analog (D/A) converter 107.

In general, as for the picture signal in the motional picture region, the picture contents are shifted by the picture motion not only between adjacent frames but also between adjacent fields, so that the sampling of the motional picture signal and the interpolation in the reproduction thereof are conventionally effected only by the in-field line-offset. However, in the case that the motion in the vertical direction of the picture, which is originally small in comparison with the motion in the horizontal direction, is comparatively small, as described above, it is possible to obtain the reproduced motional picture, which has a far superior resolution in comparison with the conventionally reproduced motional picture, by applying inter-frame signal processing on the luminance signal also.

The positions of the sub-sample carriers in the horizontal and vertical spatial frequency region, when in-field line-offset sub-sampling is applied on the picture signal, is as indicated by circular black marks ● in FIG. 17. However, when inter-field interpolation is further applied thereon, the sub-sample carriers, which are situated on the positions indicated by cross marks x in FIG. 18, are eliminated. So that, it is possible to transmit some other information multiplexed at the above eliminated positions.

The reproducible frequency range in the spatial frequency region when in-field interpolation is applied on the transmission sub-sample sequence of the picture signal which has been applied with in-field line-offset sub-sampling, as described earlier, is shaped as a triangle as shown in FIG. 19. However, when it is applied with inter-field interpolation, the reproducible frequency range is shaped as a rectangle as shown in FIG. 20, so that the reproducible frequency range is doubled in comparison with that when the conventional in-field signal processing is applied thereon.

In addition, in the picture signal which is transmitted according to the sample pattern circulated at every two frames which is basically used in the conventional sub-sample transmission, the basic frequency is 15 Hz. However, in the picture signal applied with the inter-field signal processing at every frame, the basic frequency is 30 Hz.

The human visual susceptibility is extremely sensitive to the frequency component 15 Hz, so that it has a defect that, as for the reproduced picture signal which is transmitted according to the conventional sample pattern circulated at every two frames, the flicker of 15 Hz is noticed. In contrast therewith, the reproduced picture signal, which is applied with the inter-field signal processing, is superior also with respect that the flicker is not noticed. So that, no matter how the sub-sampling system used for the encoder is selected it is possible to suppress the caused flicker of 15 Hz only by employing interfield interpolation for the decoder.

Figure 21A:
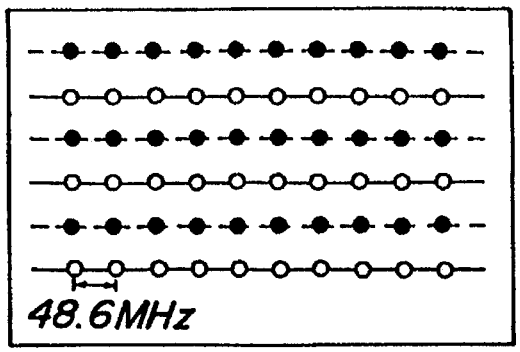
Figure 21B:
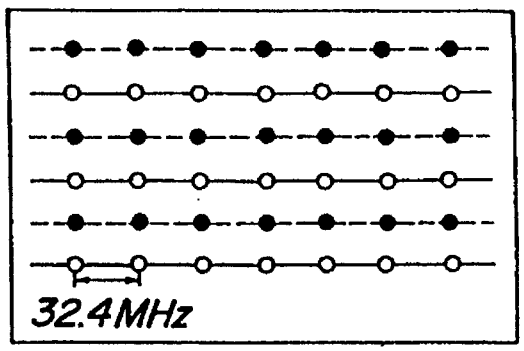

Thereupon, respective sample patterns in each stages of the encoder as shown in FIG. 16(a) are successively shown in FIGS. 21(a) to 21(e). In this connection, circular white marks ○ in these drawings indicate sample patterns of odd fields, while circular black marks ● in these drawings indicate sample patterns of even fields. Among FIGS. 21, FIG. 21(a) shows the primitive sample pattern in the analog-to-digital (A/D) converter 91 at the sampling frequency 48.6 MHz which is basically adopted for the MUSE system, while FIG. 2(b) shows the sample pattern in the sampling frequency converter 93 for converting the sampling frequency to 32.4 MHz, which is shaped as a square lattice at intervals of 1125 TV lines in the vertical direction and of 32.4 MHz in the horizontal direction.

Figure 21C:
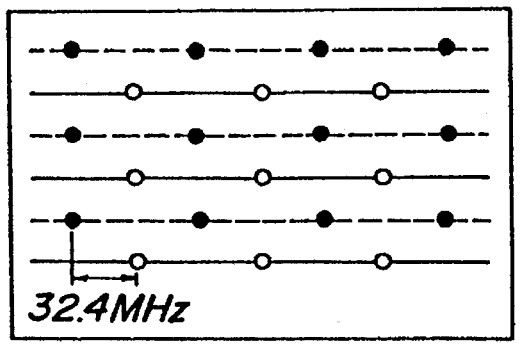

FIG. 21(c) shows the sample pattern in the sub-sampler 95 for effecting the inter-field offset subsampling at the sampling frequency 32.4 MHz, which is regarded as the sample pattern in which every other sample values are zero at the sampling frequency 32.4 MHz, although it can be sensibly regarded as the sample pattern at the sampling frequency 12.6 MHz.

Figure 21D:
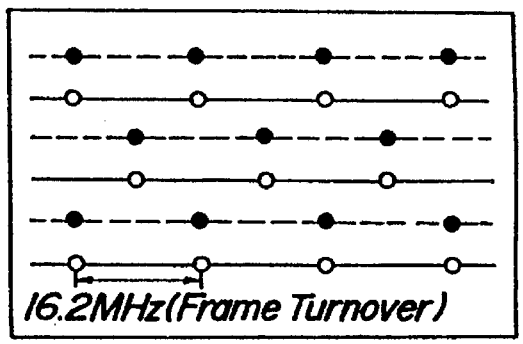
Figure 21E:
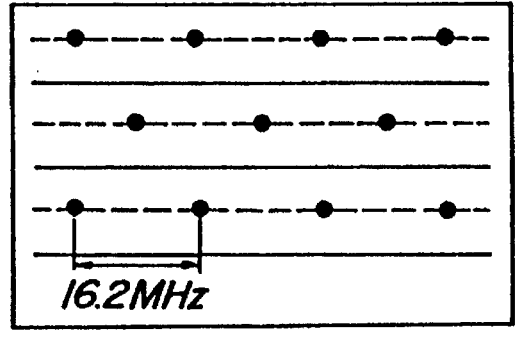

FIG. 21(d) shows the sample pattern of the MUSE system transmission signal in the sub-sample 97 for effecting the inter-frame and inter-line offset sub-sampling, while FIG. 21(e) shows the same sample pattern in which the sample values only in even fields are indicated. In this connection, as for the MUSE system transmission signal circulated at every two frames, the sample pattern as shown in FIG. 21(d) is alternately turned over at every frame.

As mentioned earlier, when the inter-field signal processing, which is applied on the picture signal in the motional signal region in which the picture motion in the vertical direction is small, is combined with the signal processing circulated at every two frames to be applied on the picture signal in the stationary picture region and the in-field signal processing to be applied on the picture signal in the motional signal region in which the picture motion is large, the overall reproduced picture quality can be extremely improved.

INDUSTRIAL APPLICABILITY

As is apparent from the above description according to the present invention, it is prevented that the horizontal higher-range signal components in the vertical frequency range from 1125/2 TV lines to 1125×3/2 TV lines in the motional picture signal of the high-vision broadcasting system in which the sub-sample transmission is employed, for instance, of the MUSE system cause the aliasing in the vicinity of the sample point 0 MHz, 1125/5 TV lines, so that a aliasing-distortionless, stable, reproduced picture can be obtained. As a result, even if the respective pass-bands of the pre-filter on the transmitting end and the interpolation filter on the receiving and reproducing end which are conventionally used for removing the aliasing distortion from the sub-sampled motional picture are expanded wider than those in the conventional case, the aliasing distortion cannot be noticed, so that it is possible to obtain a special effect such as the resolution of the reproduced motional picture quality can be remarkably raised.

In addition, the inter-field signal processing for mitigating the aliasing distortion caused in the reproduced picture in response to the sub-sampling, which comprises the limitation of the signal frequency range on the transmitting end and the interpolation on the receiving and reproducing end, is effected between each pair of odd and even fields, so as to be completed at every frame in correspondence with each other on both ends, so that it is not feared that the reproduced picture in each field is mixed with picture information of three input fields, and, as a result, the reproduced picture quality, particularly, the quality of the reproduced motional picture in which picture information is varied between successive frames is greatly improved in comparison with the conventional quality thereof.

In this connection, as described earlier, the signal processing at every one frame can obtain the picture quality exceeding a certain level as for the stationary picture also, so that it is possible to employ only one signal processing system for field-offset sub-sampling in common with both of the stationary picture and the motional picture. In this case, the arrangement can not only be provided in the small scale corresponding thereto, but many remarkable effects also can be obtained, for instance, such that the detection of picture motion which is conventionally required for controlling the change from each other between respective processing systems of the stationary and the motional pictures.

Furthermore, in the sub-sample transmission of the wide-band high-definition color picture signal, the reproduced color picture quality in the motional picture region can be greatly improved in comparison with the conventional quality by doubling the transmissible spatial frequency range of the color difference signal in the motional picture region in comparison with the conventional frequency range concerned. In addition, as for both the encoder and the decoder for the sub-sample transmission, mutual exchangability with conventional ones can be maintained.

In other words, by adopting the sub-sample transmission system of the wide-band color picture signal according to the present invention, the resolution of the motional picture region in the high-vision broadcasting can be improved and further by simultaneously adopting the conventional transmission system of this kind, high definition high vision broadcasting is facilitated, or, the arrangement of the transmission system can be simplified in a state such that the conventional picture quality is maintained.

We claim:

1. A sub-sample transmission method for wide-band color picture signals, comprising the steps of:

(a) sampling a wide-band color picture signal in accordance with a sampling pattern which circulates every two frames;

(b) determining a motional picture region and a still picture region of said wide-band color picture signal from said sampled wide-band color picture signal;

(c) inter-field offset sub-sampling said motional picture region, determined by step (b), to produce a sub-sampled motional picture region, and performing inter-field signal processing on said sub-sampled motional picture region to produce a processed motional color picture signal, wherein said inter-field offset subsampling and said inter-field signal processing are completed in every frame consisting of odd and even fields of said wide-band color picture signal; and (d) offset sub-sample transmitting the processed motional color picture signal produced in step (c).

2. A method as claimed in claim 1, wherein when said processed motional picture signal is transmitted, a vertical frequency band of said processed motional picture signal having a band-width which is substantially one to three times a Nyquist band, corresponding to a sampling frequency in a vertical frequency region, is transmitted with a limited horizontal frequency band, so as to reduce aliasing distortion caused in a reproduced picture by said inter-field offset sub-sampling.

3. A method as claimed in claim 1, wherein when said processed motional picture signal is transmitted, the picture signal is sampled by a field-offset sub-sampling in which positions of sample points are alternately shifted between adjacent fields, and a signal processing operation, including at least band-limitation of a luminance signal and interpolation of sample values, is completed every frame.

4. A method as claimed in claim 1, wherein in a color difference signal, for the motional picture region, which is transmitted with a horizontal spatial frequency band which is halved in comparison with that of a luminance signal, (i) an inter-field offset sub-sampling, (ii) a frequency band limitation for preventing an aliasing distortion caused by said sub-sampling of step (i) and (iii) an interpolation in reproduction are completed at every frame consisting of odd and even fields.

5. A method as claimed in claim 1, wherein when motion in a vertical direction in the motional picture region is below a predetermined threshold, (i) an inter-field offset sub-sampling, (ii) a frequency band limitation for preventing an aliasing distortion caused by said sub-sampling of step (i) and (iii) interpolation in reproduction for a luminance signal are effected by an inter-field processing.

* * * * *